United States Patent
George et al.

(10) Patent No.: US 12,499,068 B2
(45) Date of Patent: Dec. 16, 2025

(54) DMA CONTROL CIRCUIT WITH QUALITY OF SERVICE INDICATIONS

(71) Applicant: Apple Inc., Cupertino, CA (US)

(72) Inventors: Brett D. George, Los Altos, CA (US); Rohit K. Gupta, Santa Clara, CA (US); Do Kyung Kim, Austin, TX (US); Paul W. Glendenning, Woodside, CA (US)

(73) Assignee: Apple Inc., Cupertino, CA (US)

( * ) Notice: Subject to any disclaimer, the term of this patent is extended or adjusted under 35 U.S.C. 154(b) by 20 days.

(21) Appl. No.: 18/404,449

(22) Filed: Jan. 4, 2024

(65) Prior Publication Data

US 2024/0143530 A1     May 2, 2024

Related U.S. Application Data

(63) Continuation of application No. 17/475,074, filed on Sep. 14, 2021, now Pat. No. 11,886,365.

(60) Provisional application No. 63/078,252, filed on Sep. 14, 2020.

(51) Int. Cl.
    *G06F 13/28*    (2006.01)

(52) U.S. Cl.
    CPC .......... *G06F 13/28* (2013.01); *G06F 2213/28* (2013.01)

(58) Field of Classification Search
    CPC ...................................... G06F 13/28
    USPC ....................................... 710/22
    See application file for complete search history.

(56) References Cited

U.S. PATENT DOCUMENTS

| | | | |
|---|---|---|---|
| 4,847,750 A | 7/1989 | Daniel | |
| 5,497,476 A | 3/1996 | Oldfield et al. | |
| 5,765,023 A | 6/1998 | Leger et al. | |
| 5,884,050 A * | 3/1999 | Wheeler | G06F 13/28 710/52 |
| 5,890,012 A | 3/1999 | Poisner | |
| 6,052,744 A * | 4/2000 | Moriarty | G06F 13/4027 710/28 |
| 6,105,086 A | 8/2000 | Doolittle et al. | |
| 6,434,645 B1 | 8/2002 | Parvin et al. | |
| 7,577,773 B1 * | 8/2009 | Gandhi | H04L 49/90 710/22 |
| 8,151,008 B2 | 4/2012 | Simon et al. | |
| 8,271,700 B1 * | 9/2012 | Annem | G06F 13/28 710/22 |

(Continued)

*Primary Examiner* — Titus Wong
(74) *Attorney, Agent, or Firm* — Kowert, Hood, Munyon, Rankin & Goetzel, P.C.; Scott W. Pape; Dean M. Munyon

(57) ABSTRACT

Techniques for improving the handling of peripherals in a computer system, including through the use of a DMA control circuit that helps manage the flow of data between memory and the peripherals via an intermediate storage buffer. The DMA control circuit is configured to control timing of DMA transfers between sample buffers in the memory and the intermediate storage buffer. The DMA control circuit may output a priority value of the DMA control circuit for accesses to memory, where the priority value based on stored quality of service (QoS) information and current channel data buffer levels for different DMA channels. The DMA control circuit may separately arbitrate between multiple active transmit and receive channels. Still further, the DMA control circuit may store, for a given data transfer over a particular DMA channel, timestamp information indicative of completion of the DMA and peripheral-side operations.

20 Claims, 13 Drawing Sheets

(56) References Cited

U.S. PATENT DOCUMENTS

| | | | | |
|---|---|---|---|---|
| 8,811,470 B2* | 8/2014 | Kimura | | G06F 13/4027 |
| | | | | 375/240.01 |
| 8,880,756 B1* | 11/2014 | Birsan | | G06F 13/28 |
| | | | | 710/22 |
| 11,238,899 B1* | 2/2022 | Miller | | G11B 27/28 |
| 2003/0061414 A1 | 3/2003 | Richardson | | |
| 2005/0188119 A1 | 8/2005 | Hayden | | |
| 2005/0193155 A1 | 9/2005 | Fujita | | |
| 2006/0053236 A1* | 3/2006 | Sonksen | | G06F 13/28 |
| | | | | 710/22 |
| 2006/0224804 A1 | 10/2006 | Alexandre | | |
| 2008/0016291 A1* | 1/2008 | Adachi | | G06F 3/061 |
| | | | | 711/154 |
| 2008/0071958 A1* | 3/2008 | Honda | | G06F 13/28 |
| | | | | 710/262 |
| 2008/0080841 A1* | 4/2008 | Aso | | H04N 19/44 |
| | | | | 386/241 |
| 2008/0091851 A1 | 4/2008 | Sierra | | |
| 2008/0129882 A1* | 6/2008 | Moriyama | | G06F 3/14 |
| | | | | 386/E5.07 |
| 2008/0294801 A1* | 11/2008 | Matsuda | | G06F 13/385 |
| | | | | 710/5 |
| 2009/0069910 A1* | 3/2009 | Gabel | | G06F 3/162 |
| | | | | 700/94 |
| 2009/0310726 A1* | 12/2009 | Alankry | | H04J 3/0697 |
| | | | | 375/359 |
| 2010/0312569 A1* | 12/2010 | Sebestian | | G11B 20/00007 |
| | | | | 713/323 |
| 2011/0231566 A1* | 9/2011 | Gelter | | H04N 21/4341 |
| | | | | 709/231 |
| 2014/0006665 A1* | 1/2014 | Amano | | G06F 13/362 |
| | | | | 710/116 |
| 2014/0019664 A1* | 1/2014 | Simon | | G06F 13/28 |
| | | | | 710/308 |
| 2016/0357454 A1* | 12/2016 | Lee | | G06F 13/385 |
| 2020/0174953 A1* | 6/2020 | Sanghi | | G06F 13/28 |
| 2021/0266610 A1* | 8/2021 | Chellappan | | H04L 65/80 |

* cited by examiner

DMA CONTROL CIRCUIT WITH QUALITY OF SERVICE INDICATIONS

The present application is a continuation of U.S. application Ser. No. 17/475,074, entitled "DMA Control Circuit with Quality of Service Indications," filed Sep. 14, 2021, which claims priority to U.S. Provisional App. No. 63/078,252, entitled "Audio DMA Engine," filed Sep. 14, 2020; the disclosures of each of the above-referenced applications are incorporated by reference herein in their entireties.

BACKGROUND

Technical Field

This disclosure is generally directed to transfers of data in computer systems between memory and peripherals, including using a circuit that controls direct memory access (DMA) transfers.

Description of the Related Art

Input/output (I/O) devices are fundamental parts of computer systems, along with memory, central processing units (CPUs), and various communication interconnections. I/O devices, or peripherals, constitute the hardware that is used by computer systems to interface to human users or other computer systems. In many modern systems, peripherals, as well as the various other elements of a computer system, may be found on a single integrated circuit (also called a system on a chip, or SoC), while in other cases, peripherals may be located on different integrated circuits from the CPU and memory.

Different types of peripherals in a computer system may have different timing requirements. Peripherals handling audio data typically have relatively strict timing parameters. Violation of these parameters for speaker or microphone data, for example, would be readily noticeable to users of the computer system. Adding to this complexity, multiple peripherals are commonly active in a computer system at a given time. Accordingly, software executing on the CPU may have to account for numerous peripherals executing concurrently, where each peripheral may have different timing needs.

Transfer of data within a computer system may occur via various data paths and using different paradigms. Direct memory access, or DMA, is a technique in which circuits within a computer system are permitted to access data in system memory independent from the CPU. DMA stands in contrast to programmed input/output (PIO), in which a CPU is involved over the course of a transfer, and thus has a reduced ability to perform other work vis-à-vis a DMA scenario. In contrast, during a DMA transfer, the CPU is able to perform other work after initiating the transfer. Subsequently, the CPU will receive an indication (e.g., an interrupt) that the transfer is complete.

SUMMARY

The present disclosure is directed to techniques for improving the handling of peripherals in a computer system, including through the use of a DMA control circuit that helps manage the flow of data between system memory and the peripherals via an intermediate storage buffer. Disclosed embodiments permit multiple transfer channels, where each channel corresponds to a specific peripheral and involves a DMA transfer between system memory and the intermediate storage buffer, as well as a data transfer between the buffer and the peripheral. Distinct sets of channels are contemplated for transmit and receive operations (i.e., from system memory to a given peripheral, and vice versa). The DMA control circuit may arbitrate between these channels separately for transmit and receive operations, doing so according to desired qualities of service (QoS).

To indicate QoS, the DMA control circuit may be programmed on a per-channel basis with programming information such as a target channel data rate and threshold levels for a channel data buffer within the intermediate storage buffer. The DMA control circuit may then be configured to monitor the channels to determine whether the current latency provided by the system memory is sufficient to meet the desired QoS for each channel. Based on this determination, the DMA control circuit is configured to output a current latency tolerance value that indicates a priority level for accesses to memory. For example, if a channel has a buffer level that is below desired levels, the current latency tolerance value may cause an increase the DMA control circuit's priority for memory. In this manner, once programmed by the CPU, the DMA control circuit may operate to provide desired qualities of service based on this feedback loop, without additional input from the CPU.

The DMA control circuit may also be configured to capture and provide timestamp information regarding the progress of a transfer of a block of data over a particular channel. In some embodiments, for a given transfer, a first timestamp may store a value indicative of a time of completion of a DMA operation between the memory and the intermediate storage buffer. A second timestamp may be indicative of a time of completion of a data transfer between the intermediate storage buffer and an interface of the first peripheral. Upon completion of a transfer, the DMA control circuit may provide an interrupt to the processing circuit, which then allows software to retrieve the timestamps. Timestamp information provides software more granular information about system timing, thus allowing peripheral data requirements to be met using the least possible amount of margin. This paradigm may reduce or eliminate interruptions caused by transmit overrun (the transmit channel data buffer being full when the DMA control circuit tries to write data from system memory to the intermediate storage buffer, an exception condition also referred to as overflow), and receive underrun (the receive channel data buffer being empty when the DMA control circuit tries to read data from the receive channel data buffer and write it to system memory, an exception condition also referred to as underflow).

These techniques thus help enforce desired qualities of service for multiple active peripherals on a per-channel basis, while also providing software increased visibility regarding the timing details of a given transfer.

DETAILED DESCRIPTION

Figure 1:
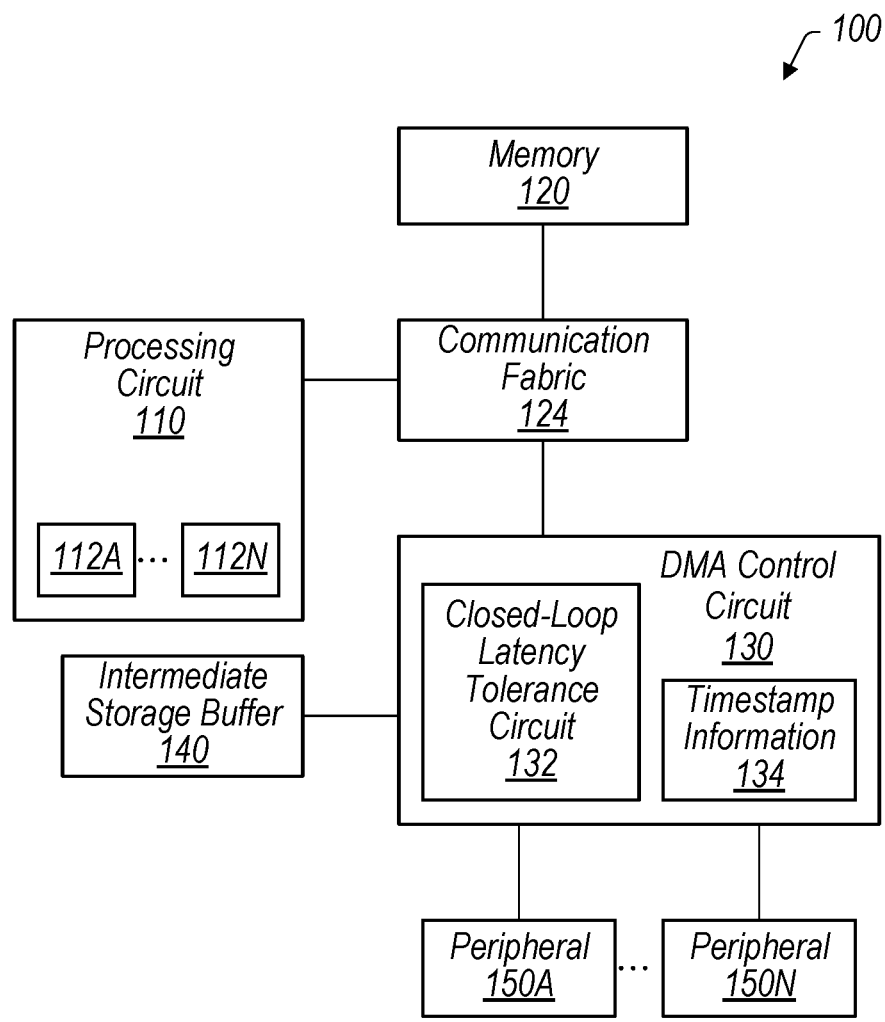
FIG. 1 is a block diagram of a computer system configured to facilitate handling of transactions involving peripherals.

FIG. 1 is a block diagram of a computer system 100. As shown, computer system 100 includes a number of high-level components, including processing circuit 110 (which may include one or more processing cores 112), memory 120, communication fabric 124, DMA control circuit 130, intermediate storage buffer 140, and a plurality of peripherals 150 (exemplified by peripherals 150A through 150N). As will be described below, DMA control circuit 130 includes a number of features that provide improved handling of transactions involving system peripherals.

Software executing on cores 112 of processing circuit 110 commonly needs to transmit data to, and receive data from, peripherals 150. This interaction often occurs through complex interconnections between circuits in system 100. One result of this complexity is that the timing of data transfers to and from peripherals 150 is often variable and thus uncertain from the perspective of processing circuit 110.

As noted, certain peripherals have strict timing requirements. Some peripherals need to transmit and receive data in "real time" in order to operate effectively. In some cases, if such peripherals do not timely transmit or receive data, the system may fail or cause an undesirable user experience.

In order to meet timing requirements in the face of uncertain system timing, software may frequently need to establish large margins for data buffers corresponding to peripherals. Consider a buffer corresponding to data to be transmitted to a peripheral that is configured to consume buffer data at a particular rate. Given that there is uncertainty about how long it may take data to be sent through the system, systems frequently employ the practice of having the processing circuit write extra data to the buffer in order to accommodate worst-case timing conditions. A similar scenario exists for data being received by the processing circuit from the peripheral. These extra margins can lead to inefficiency in system operation.

This problem is particularly acute when working with audio data. Unlike with other types of peripherals, it is not feasible to simply build in additional latency for transfers to and from audio peripherals, as this additional latency would not satisfy the strict audio timing requirements. In short, working with audio data is challenging because a real-time guarantee and a short latency are both desired.

The present disclosure recognizes the limitations of using processing circuits to provide real-time guarantees to software communicating with peripherals. Processing circuits are complicated, and commonly accommodate such factors as cache misses, interrupts, running multiple programs, etc. As such, there are challenges with a processing circuit-based paradigm for ensuring a desired latency for devices such as audio peripherals.

To address these problems, the present disclosure contemplates the use of a DMA control circuit 130 to help manage the transfer of data between memory 120 and peripherals 150 via intermediate storage buffer 140. Peripherals 150 may include at least one peripheral with real-time constraints, such as a peripheral handling audio data. DMA control circuit 130 can be configured with programming information for individual transmit and receive channels for each supported peripheral. This programming information may include transfer descriptor information indicating locations and sizes of sample buffers in the memory for different ones of a plurality of DMA channels. In some cases, this programming information may also include quality of service (QoS) information for individual channels. This programming information may thus be used by circuit 130 to track in real time whether a desired QoS is being met for each channel.

For a given data transfer over a transmit channel, DMA control circuit 130 manages a DMA of data between a transmit buffer in memory 120 and a channel data buffer in intermediate storage buffer 140 according to the transfer descriptors, followed by a data transfer between buffer 140 and an interface to a particular peripheral 150. Conversely, for a given data transfer over a receive channel, DMA control circuit 130 manages a data transfer between an interface to a peripheral 150 and buffer 140, followed by a DMA of data between the buffer 140 and a receive buffer in memory 120. The use of DMA control circuit 130 frees processing circuit 110 from having to manage the timing of these transfers.

Examples of possible internal structures of DMA control circuit 130 are described in subsequent figures. In some embodiments, DMA control circuit 130 includes a closed-loop latency tolerance (CLLT) circuit 132 that helps enforce specified QoS values by indicating what priority is needed by DMA control circuit 130 for accesses to memory 120. This priority, or current latency tolerance (CLTR) value, may be determined in response to the QoS information and current DMA channel conditions. Thus, if a channel data buffer within buffer 140 for a particular channel is not being serviced quickly enough, a CLTR value generated by circuit 132 may indicate that memory 120 should prioritize the memory requests of DMA control circuit 130 over memory calibration operations or the memory requests of other entities. In this manner, DMA control circuit 130 is able to tell the system what its timing requirements are on a real-time basis, thus helping to enforce the specified QoS for each channel. Further details regarding CLLT circuit 132 are provided with reference to FIG. 7.

Additionally, in some embodiments, DMA control circuit 130 may store timestamp information 134 that is indicative of the timing of a particular transfer within the system. For example, timestamp information 134 may store for a particular transfer, a first timestamp indicative of a time of completion of a DMA operation between memory 120 and intermediate storage buffer 140, as well as a second timestamp indicative of a time of completion of a data transfer between intermediate storage buffer 140 and an interface to the corresponding peripheral 150. The availability of timestamp information 134 may be signaled to processing circuit 110 via an interrupt, such that upon completion of the transfer of the block of data over the given DMA channel, the apparatus is configured to store the first and second timestamps in a location that is readable via an external interface of the DMA control circuit. Software executing on processing circuit 110 can then read timestamp information 134, thus allowing more granular insight into the timing of data transfers within system 100. Using this information, software may be able to more accurately assess the size of the margins in the relevant sample buffers. Accordingly, with accurate timestamps, software is able to better understand where DMA control circuit 130 is reading or writing from memory, and with this information, software can more closely provide "just in time" data to be read/written from memory. Additional details regarding timestamp information 134 is provided below with reference to FIG. 3.

Note that the enforcement mechanism for memory priority and timestamps may be used either separately or together in order to reduce latency of data transfers between memory 120 and peripherals 150. DMA control circuit 130 may include further features in various embodiments, including arbitration circuits that are configured to select the most critical requests for immediate servicing. An arbitration circuit may be configured to monitor current channel data buffer levels relative to programmed threshold levels, and to prioritize traffic accordingly. Such arbitration may be performed separately for transmit and receive channels. In order to be power efficient, it is typically undesirable for the system to be too far ahead in terms of data transfers, and thus DMA control circuit 130, unlike other DMA paradigms, may stop and start DMA transfers in accordance with programmed QoS parameters. This approach may reduce the possibility that system 100 will be overwhelmed by numerous small data transfers. Conversely, in some embodiments, when it is determined that at least one channel needs to be serviced, pending requests for all other active channels may each be serviced as well.

Figure 2:
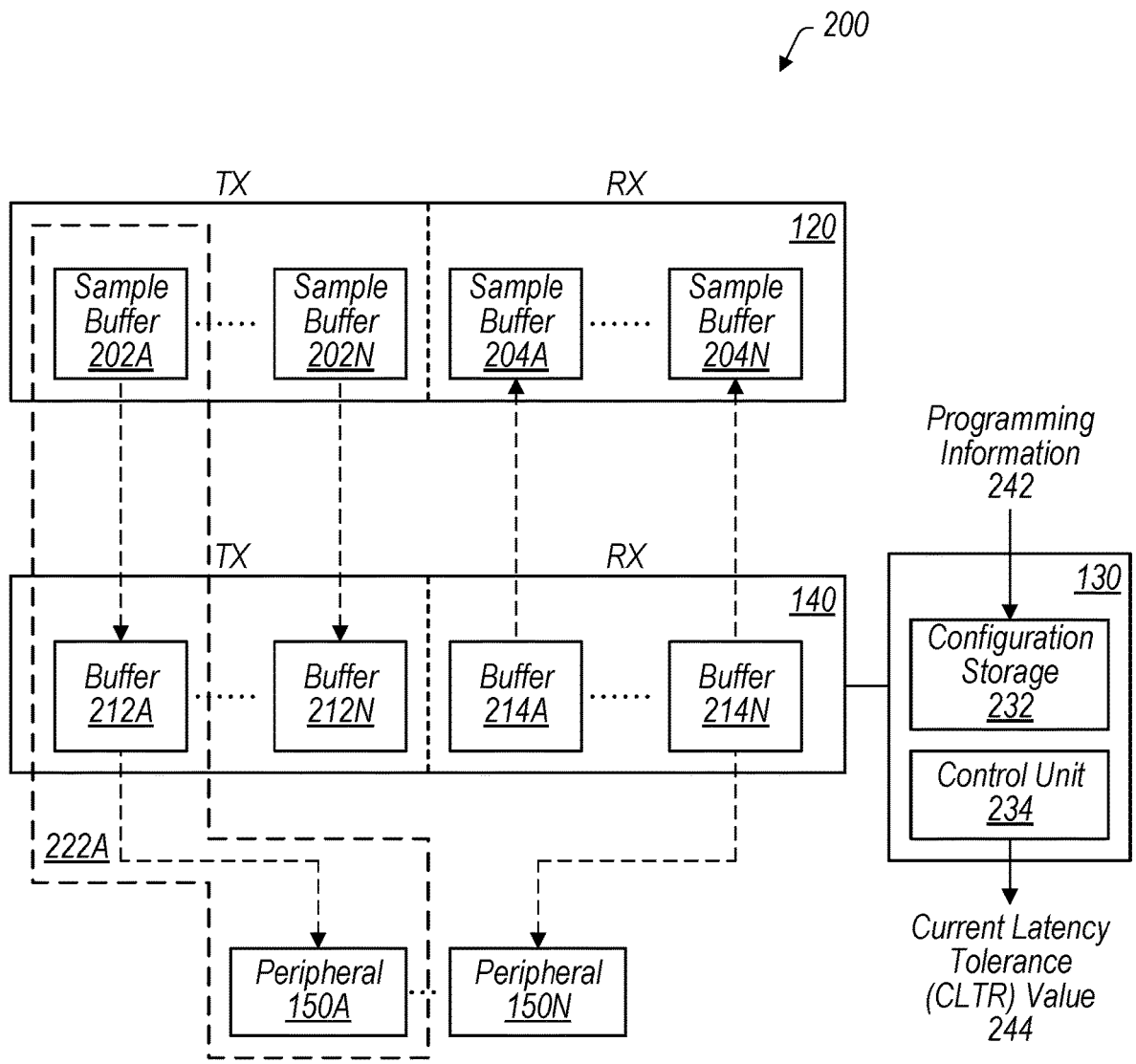
FIG. 2 is a block diagram of a computer system that includes a DMA control circuit facilitating transactions involving peripherals over multiple DMA channels.

FIG. 2 is a block diagram that illustrates the concept of DMA channels that are managed by DMA control circuit 130. System 200 in FIG. 2 depicts sample buffers 202 and 204 in memory 120, channel data buffers 212 and 214 in intermediate storage buffer 140, and peripherals 150. DMA control circuit 130 includes configuration storage 232 and control circuit 234, which implements a variety of functions.

Configuration storage 232 refers to any set of storage elements or registers within DMA control circuit 130 that store information that governs the operation of the circuit generally or a particular transfer. Configuration storage 232 may thus refer to discrete storage elements/registers within circuit 130. Configuration storage 232 does not, however, cover storage elements/registers that store the actual data being transferred, which is found in channel data buffers 212 and 214. Information stored in configuration storage 232 is broadly referred to in this disclosure as "programming information." This is a broad term used to refer to information that is used to direct the operation of circuit 130, and as discussed below, may refer to transfer descriptor information, as well as quality of service (QoS) information. Programming information is distinct from the actual data being transferred over DMA channels.

As used in this disclosure, a "DMA channel" refers to a set of storage locations that comprise a path for data between memory 120 and peripherals 150. In various embodiments, there are separate transmit and receive DMA channels operating in opposite directions. Representative DMA transmit channel 222A is shown inside dashed lines in FIG. 2, and is comprised of transmit sample buffer 202A, FIFO 221A, and peripheral 150A. Additional channels are present in FIG. 2 without being specifically indicated. For example, system 200 also includes a DMA receive channel that includes peripheral 150A, receive channel data buffer 214A, and receive sample buffer 204A. System 200 also includes separate DMA transmit and receive channels for peripheral 150N. In some instances, the DMA transmit and receive channels may include audio channels.

The DMA channels shown in FIG. 2 are indicated as having a path between a sample buffer and a FIFO, and between the FIFO and a peripheral. The dashed lines are intended to indicate that this may constitute a logical path. In various embodiments, the path for peripheral data may pass through portions of DMA control circuit 130. Thus, data being written to a particular peripheral may, in some cases, travel from a transmit sample buffer 202 through DMA control circuit 130 to the corresponding channel data buffer 214, and from there back through DMA control circuit 130 to the particular peripheral 150. Data being read from a particular peripheral may have the same path in reverse. The "logical path" shown in FIG. 2 is illustrated to simplify the flow of data, while still making the point that each channel may include dedicated storage (e.g., distinct sample buffers and FIFOs) that is separate from the dedicated storage for other peripherals having their own channels. The use of this dedicated storage allows DMA control circuit to separately control the various DMA channels.

In order to write information to a given peripheral, the corresponding DMA channel can be operated by sending programming information to DMA control circuit 130 and then writing a block of data to the corresponding transmit sample buffer 202. The transmit sample buffer is a dedicated region of memory for that channel—for example, transmit sample buffer 202A corresponds to peripheral 150A, while transmit sample buffer 202N corresponds to peripheral 150N, etc. After DMA control circuit 130 receives, from processing circuit 110 (i.e., the device requesting the transfer), the programming information for the block of data, DMA control circuit 130 is configured to complete transfer of the block of data over the particular DMA channel without further involvement from processing circuit 110. This advantageously frees processing circuit 110 to be able to perform other tasks. As will be described below, DMA control circuit is configured to be able to start stop portions of the transfer according to QoS information for that channel.

In various embodiments, the programming information for a given DMA channel includes one or more transfer descriptors stored in the configuration storage, where a given transfer descriptor includes a starting location in the memory and a size of a block of data to be transferred. Once transfer descriptors for a given DMA channel are set up, DMA control circuit 130 is configured to transfer data between the memory and a corresponding peripheral according to the one or more transfer descriptors. Note that processing circuit 110 may continue to write additional transfer descriptors to the sample buffers 202, as blocks corresponding to previously written descriptors are handled. Over the lifetime of a channel (e.g., from when an device such as an audio device is activated until it is deactivated), DMA control circuit 130 can continuously transfer data to a peripheral according to the transfer descriptors written to configuration storage 232 for that channel by processing circuit 110.

The programming information for a given DMA channel may also include quality of service (QoS) information, which indicates how data on that DMA channel should be treated from a priority standpoint relative to other DMA channels. In some embodiments, QoS information includes a target channel data rate and a transfer threshold level of a corresponding channel data buffer within intermediate storage buffer 140. As will be described with respect to FIG. 6, QoS information may also include an urgent priority threshold for each channel; this threshold may indicate a subset of those channels triggered for DMA that are to be prioritized in a given cycle. As shown in FIG. 2, there is a separate transmit and receive channel data buffer for each peripheral. In some cases, the channel data buffers 212/214 may be allocated from storage on an SRAM coupled to DMA control circuit 130. The channel data buffers 212/214 may be implemented as first-in, first-out (FIFO) buffers in some embodiments.

In general, control circuit 234 is configured to control the timing of DMA transfers, as well as data transfers between intermediate storage buffer 140 and interfaces to corresponding peripherals. These transfers are between sample buffers 202/204 in the memory and intermediate storage buffer 140: in the transmit direction, from transmit (TX) sample buffers 202 to channel data buffers 212, and in the receive direction, from channel data buffers 214 to sample buffers 204. This timing control may take several forms. In some cases, a particular DMA channel may be prioritized or not based on a comparison of data levels of the corresponding channel data buffer to stored QoS information that is relevant to the particular channel. For example, a TX channel may be determined to be prioritized if the current data level for its channel data buffer falls below an urgent priority threshold level for that channel (the urgent priority threshold level being a type of QoS information for that channel). Similarly, a receive (RX) channel may be determined to be prioritized if the current data level for its channel data buffer rises above an urgent priority threshold level for that channel. Additionally, a particular DMA channel may be selected in a particular arbitration round from among all channels that are currently prioritized; alternately, all active channels may be service if there is a single prioritized channel if memory access synchronization is enabled. Still further, the timing of DMA transfers may be affected by control circuit 234 outputting a priority value that indicates a priority of DMA control circuit 130 for accesses to memory 120. One form of this priority value is referred to herein as a current latency tolerance value (CLTR) 244, which may correspond to the output of CLLT circuit 132 shown in FIG. 1. This value, which is discussed further relative to FIG. 7, indicates, the amount of time until a buffer exception condition (overrun or underrun) will occur if memory 120 does not service any requests from DMA control circuit 130. Control unit 234 may output separate CLTR values for both transmit and receive channels in some embodiments.

For the transmit direction, once programming information, including QoS information, is received for a given DMA channel and a transmit sample buffer 202 is loaded, control circuit 234 can begin to operate. Control circuit 234 is configured to fill the corresponding channel data buffer 212 for the DMA channel, and to monitor data levels for that buffer. Control circuit 234 is further configured to use the monitored data levels and the QoS information for that DMA channel to manage the transfer from channel data buffer 212 to peripheral 150. As the data level of channel data buffer 212 for a particular DMA channel falls below the programmed transfer threshold level, control circuit 234 is configured to cause the buffer 212 to be refilled from transmit sample buffer 202 via one or more DMA transfers.

Further, control circuit 234 is configured to control data transfers between intermediate storage buffer 140 and peripherals 150. Still further, control circuit 234 is configured to output a CLTR value that indicates a priority level of the apparatus for accesses to the memory. The CLTR value may indicate, for example, that the target channel data rate is not being met for a channel in the transmit direction, and thus indicate, to the memory, that the priority of DMA control circuit 130 for memory reads should be increased relative to other requests for the memory (e.g., other requesting entities, memory calibration requests).

Control circuit 234 also supports the transfer of data from peripherals 150 to receive sample buffers 204. The receive process works in a similar fashion to the transmit process described above, but in the reverse direction. First, software executing on processing circuit 110 creates a receive sample buffer 204, and then writes programming information to configuration storage 232 within DMA control circuit 130. This programming information may include transfer descriptors for the receive DMA channel, as well as other programming information that enables the channel, including QoS information that may specify a target channel data rate and transfer threshold level. When a receive channel is enabled, the channel data buffer 214 dedicated to that channel is initially empty. For a particular DMA channel, as DMA control circuit 130 begins receiving data from a corresponding peripheral 150, it is stored in the corresponding channel data buffer 214. When the level of buffer 214 reaches the transfer threshold, control circuit 234 triggers, and begins performing DMAs to corresponding receive sample buffer 204 based on the descriptors that have been set up. As with the transmit channels, control circuit 234 may also be configured to output a CLTR value for the receive channels based on programmed QoS information and current conditions for individual channels.

Figure 3:
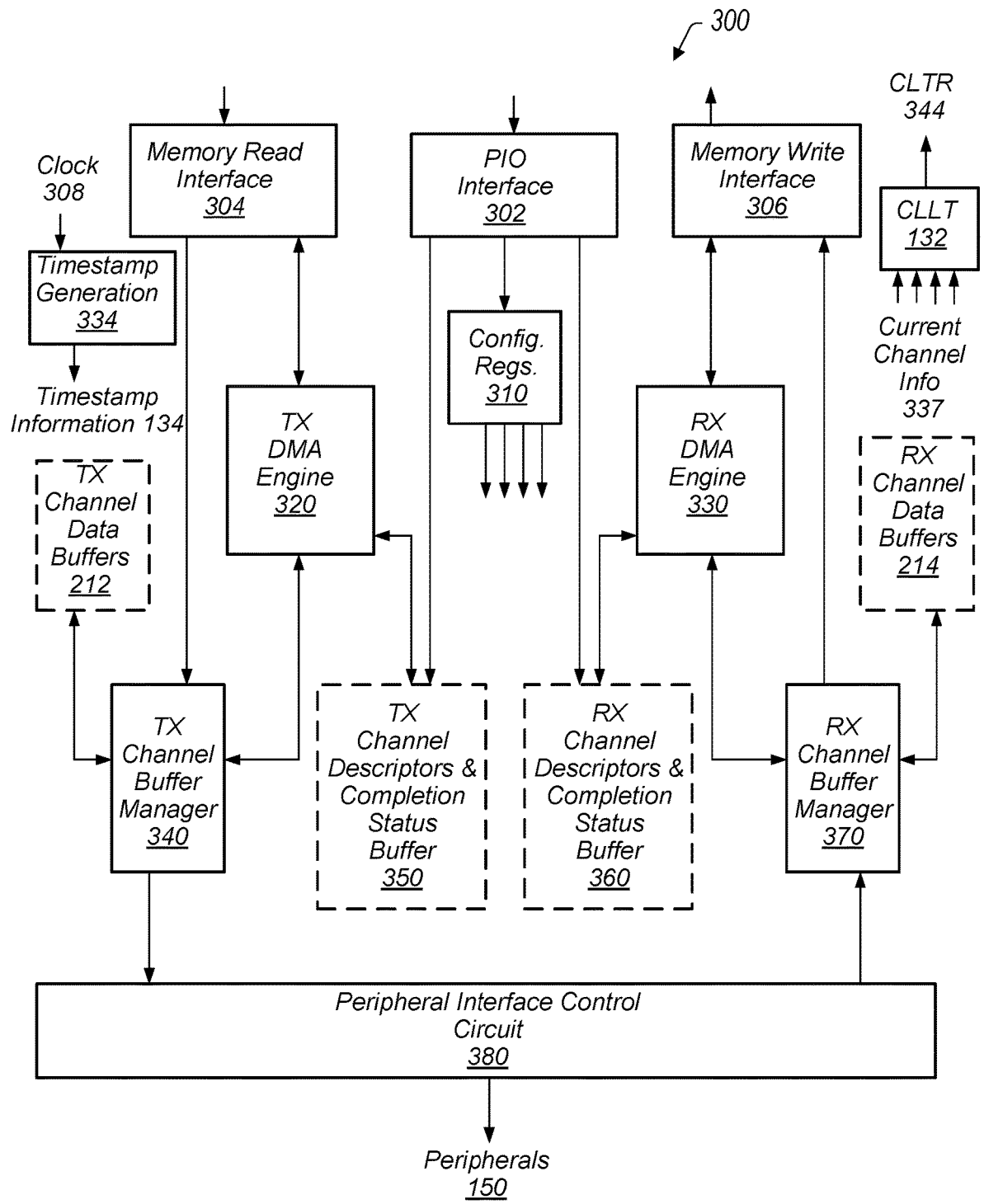
FIG. 3 is a block diagram of one embodiment of a DMA control circuit.

Turning now to FIG. 3, a block diagram of one embodiment of functionality associated with DMA control circuit 130 is shown. As shown, different portions of DMA control circuit 130 implement separate transmit (TX) and receive (RX) channels. Several of the blocks depicted have identical functions within TX and RX portions of the circuit (e.g., TX DMA engine 320 and RX DMA engine 330 have similar functionality.)

As indicated in FIG. 2, circuitry within DMA control circuit 130 can be broadly considered to include configuration storage 232 and control circuit 234. In the embodiment shown in FIG. 3, configuration storage 232 corresponds to configuration registers 310, as well as buffers 350 and 360 that store the channel descriptors for the TX and RX channels. Control circuit 234 corresponds to various ones of the remaining blocks pictured in FIG. 3.

As depicted, DMA control circuit 130 is configured to interface with processing circuit 110 and memory 120 via an interconnect such as communication fabric 124, and with peripherals 150 via peripheral interface control circuit 380. In some embodiments, DMA control circuit 130 is also configured to interface with a separate intermediate storage buffer 140, which may be implemented using a static RAM (SRAM) in some embodiments. Components that may be implemented on a separate buffer 140 in one implementation are shown using dashed lines in FIG. 3. In some embodiments, intermediate storage buffer 140 may be implemented within DMA control circuit 130.

DMA control circuit 130 may be initialized based on programming information received via programmed I/O (PIO) interface 302 from software executing on one or more cores 112 of processing circuit 110. PIO interface 302 provides a memory-mapped I/O interface to the software. In one implementation, a portion of the accesses made through interface 302 are routed directly to configuration registers 310, while other accesses are converted to the interface to buffers 350/360, which store transfer descriptors and completion status information for individual data transfers.

The programming information may include global programming information as well as per-channel programming information. Per-channel programming information may include QoS information that specifies a target channel data rate (this permits utilization of CLLT circuit 132 for QoS support). The programming information may also include the channel data buffer size and starting location (base), the transfer threshold level, urgent priority threshold level, the transfer burst size and data size, as well as arbitration parameters. Additionally, PIO interface 302 can receive various initialization values, such as those that program the interfaces to peripherals 150, clear interrupt and error status locations, and initialize various types of interrupts. Programming information is stored in configuration registers 310, whose values may be disseminated throughout DMA control circuit 130.

After a given TX/RX channel is initialized, channel transfer descriptors may be written to buffers 350/360 via PIO interface 302 by software executing on cores 112 of processing circuit 110. In one embodiment, each of buffers 350/360 are split between storage for transfer descriptors and storage for completion status information. One possible implementation of buffers 350/360 is a single-ported SRAM that arbitrates between accesses from PIO interface 302 and those from DMA engines 320/330, where a given transfer buffer can hold up to four descriptors for a channel at a given time. Each transfer descriptor specifies the start address and the size of a memory block in a sample buffer 202/204. The entire sample buffer may be described by one or multiple transfer descriptors. One possible format for a transfer descriptor is provided below.

Broadly speaking, once a TX channel is programmed and transfer descriptors have been written to buffer 350, data transfers over the channel can begin. For the TX direction, initially the entire channel data buffer 212 is initially filled, at which point the DMA transfer pauses. Once the peripheral begins to consume data (meaning that data is moved from the channel data buffer to the peripheral), the channel data buffer level decrements. When the buffer level goes below the software programmable threshold (i.e., the transfer threshold level), the DMA for the transmit channel resumes to fill the entire buffer again. Likewise, for receive channels, the channel is programmed and transfer descriptors are written to buffer 360. The channel data buffer 214 is initially empty. Whenever the peripheral produces a threshold amount of data, a channel DMA operation begins to empty the channel data buffer.

Thus, unlike various other DMA paradigms, DMA control circuit 130 is configured to periodically adjust timing of the DMA transfer based on the rate the corresponding peripheral 150 consumes/produces data in the channel data buffers 212/214 located in intermediate storage buffer 140. Thus, if a peripheral 150 for a TX channel is not consuming enough data to drop the channel data buffer below its transfer threshold level, DMA transfers from memory 120 to intermediate storage buffer 140 may be stopped. On the other hand, once a peripheral consumes enough data such that the data level for a channel data buffer for a particular channel falls below the transfer threshold level, DMA transfers from memory 120 may be restarted. Similarly, if a peripheral 150 for an RX channel is not supplying enough data to increase the channel data buffer above its transfer threshold level, DMA transfers from intermediate storage buffer 140 to memory 120 may be stopped, with transfer resuming once the data level rises above the transfer threshold.

On the other hand, if a peripheral 150 for a particular TX channel is consuming data more quickly than intermediate storage buffer 140 is being written to, this may result in a buffer underrun. As such, DMA control circuit 130 may prioritize that particular TX channel relative to other TX channels. Additionally, as described below, closed-loop latency tolerance (CLLT) circuit 132 may be used to indicate to memory 120 that the memory access priority of DMA control circuit 130 should be increased relative to other requesting entities (e.g., processing circuit 110), as well as relative to performing internal memory operations such as calibrations. Similarly, if a peripheral for a particular RX channel is supplying data to intermediate storage buffer 140 more quickly than that data is being written to memory, this may result in a buffer overrun. As such, DMA control circuit 130 may prioritize that particular RX channel relative to other RX channels. Additionally, CLLT circuit 132 may be used to indicate to memory 120 that the memory access priority of DMA control circuit 130 should be increased.

Upon the data transfer completion of a memory block described by a transfer descriptor, DMA control circuit 130 is configured to report the completion status for that transfer and store the completion status in buffers 350/360. This completion status may include timestamp information about the timing of the transfer. If interrupt generation is enabled for the transfer descriptor, an interrupt to processing circuit 110 is generated Like the transfer descriptor buffer, the completion status buffer for each channel can store four entries in one embodiment; software can read the completion status through PIO interface 302.

DMA engines 320 (TX) and 330 (RX) are responsible for reading TX/RX channel transfer descriptors, monitoring channel data buffers in intermediate storage buffer 140, memory read/write request generation, and completion status reporting. Engines 320/330 may execute these operations in parallel for all enabled channels. As discussed further below, in some embodiments, DMA engine 320 may perform arbitration as needed between all eligible TX channels, while DMA engine 330 may perform arbitration as needed between all eligible RX channels.

In order to perform a TX operation in one embodiment, TX DMA engine 320 provides a request to memory read interface 304 that specifies the channel number, memory address, and request size. In one embodiment, memory read interface 304 stores requested reads in a table, and records an outgoing timestamp produced by timestamp generation circuit 334. When the requested read data returns from memory 120, another timestamp value from circuit 334 may be taken, and the difference between the current and saved timestamp is the current read latency, which may then be reported to configuration registers 310.

Once data requested by TX DMA engine 320 is returned via memory read interface 304, this data is stored in TX channel data buffers 212 using TX channel data buffer manager 340. TX buffer manager 340 may maintain read and write pointers for each channel data buffer 212, which, as noted, may be implemented as a FIFO buffer within a shared SRMA in one implementation. Initially, buffer manager 340 may write each channel data buffer's base and size offset for the shared SRAM from programming information stored in configuration registers 310. When data is returned from memory read interface 304, a number of bytes in the transfer is indicated. This read request is then translated into a particular location in intermediate storage buffer 140 based on the channel number and the current location of the write pointer. After buffer 140 is written, the write pointer for channel data buffer 212 is adjusted for the next write. In one embodiment, DMA engine 320 initially fills the entire channel data buffer 212, and then pauses until the corresponding peripheral 150 begins to consume data and the level of channel data buffer 212 goes below the programmed transfer threshold level.

In one embodiment, the fetched data in the channel data buffer in intermediate storage buffer 140 is transferred to the corresponding peripheral 150 via peripheral interface control circuit 380 as long as the channel data buffer has at least the peripheral transfer data size (a configurable parameter of the peripheral that may be stored in configuration registers 310) and the peripheral sends a request to receive data. Data may be transferred based on the current location of the read pointer for channel data buffer 212, which may be updated after each peripheral access. In one embodiment, peripheral interface control circuit 380 operates in two different clock domains: one portion operates in the main system clock domain, the other in the (typically slower) peripheral clock domain.

The RX channels work in a similar manner to the TX channels, although in the reverse direction. Software running on processing circuit 110 creates audio sample buffers in memory, builds and writes the sample buffer's transfer descriptors into buffer 360. RX channel buffer manager 370 manages read and write pointers for each RX channel. Using the current value of the write pointer, data is written from a peripheral 150 to the appropriate channel data buffer 214 in intermediate storage buffer 140 via peripheral interface control circuit 380 when some minimum amount of data (a configurable parameter) is available at the peripheral. The write pointer for the RX channel may be adjusted after each write from a peripheral 150. Channel data buffer 214 for a particular channel is initially empty. As RX data is read from a peripheral 150 and stored in channel data buffer 214, the level of the buffer increments. When the channel data buffer level reaches the transfer threshold level, RX DMA engine 330 triggers, and uses the read pointer to read from channel data buffer 214 and write this data to memory 120 via memory write interface 306, thus draining data from channel data buffer 214.

Given that DMA control circuit 130 is configured to support multiple TX and RX channels, various arbitration paradigms may be used to prioritize access to memory 120. In one embodiment, channels whose data buffers are triggered by the urgent priority threshold (i.e., TX buffers having less data than the urgent priority threshold amount and RX buffers having more data the urgent priority threshold amount) get prioritized and serviced first in round-robin fashion. In some embodiments, once all the prioritized channels' data buffer levels are satisfied relative to the urgent priority thresholds, all triggered channels (i.e., those channels eligible for DMA based on a comparison of current data level and transfer threshold level) may be serviced in round-robin fashion. Note that, in some embodiments, there may not be an urgent priority threshold that is separate from the transfer threshold—in such cases, all triggered channels are serviced in round-robin fashion.

In each arbitration "round," a number of memory burst requests may be specified—this number may be based on channel arbitration weights that may be assigned during channel initialization. In some case, a single burst request can be for up to 128 bytes, which is equivalent to 83.3 µs, 333 µs, or 1.33 ms worth of data for 1500 KiB/s, 375 KiB/s, and 93.75 KiB/s bandwidth channels, respectively. In some cases, a trigger on one channel can optionally service all the other channels, both TX and RX. Thus, in some operating modes, if there is any TX channel that is triggered based on a comparison of current data levels to the transfer threshold level, all enabled TX channels are serviced at that time as a power-saving mechanism. (The same operation is also possible for RX channels.)

DMA control circuit 130 may outputting a priority value using CLLT circuit 132. As shown, circuit 132 receives current channel information 337 and produces CLTR values 344. In one embodiment, current channel information 337 may include indications of the current TX and RX channels, as well as an indication of the current data levels of those channels. As will be described below with respect to FIG. 7, CLLT circuit 132 may multiply the desired channel transfer rate for the current TX channel by the data level of that channel, resulting in a channel CLTR value that is indicative of an amount of time until a buffer underrun for that channel if no memory access is provided. A similar operation may be performed for the current RX channel to determine a channel CLTR value that is indicative of an amount of time until a buffer overrun condition occurs. CLLT circuit 132 may then output indications of the most latency-sensitive TX and RX channels (i.e., those channels have the lowest channel CLTR value for TX and RX channels, respectively) as CLTR values 344. These values may be output to memory 120 or another system component such as a power management unit, thereby causing the priority of DMA control circuit 130 to be altered with respect to memory 120 relative to other requesting entities or internal operations of memory 120. In this manner, for example, the priority of DMA control circuit 130 for memory 120 may be increased to prevent a buffer exception condition for TX and RX channels.

As noted, DMA control circuit 130 also supports reporting of timestamp information 134 to software executing on processing circuit 110. The purpose of timestamp information 134 is to provide information about the timing of each block of data as it travels throughout the system. In one embodiment, timestamp information 134 is captured at two different points: completion of a DMA transfer between memory 120 and intermediate storage buffer 140, and completion of a data transfer between intermediate storage buffer 140 and interfaces to peripheral 150. Timestamp information 134 may be generated by timestamp generation circuit 334 based on a system clock 308 that is also shared by other system components such as processing circuit 110 in order to provide a common time base. Timestamp information 134 may then be stored in buffers 350 and 360, depending on the direction of the transfer. These buffers are visible to software. Accordingly, processing circuit 110 may be notified of the presence of timestamp information 134 by an interrupt or other mechanism.

In one embodiment, the precise timestamp capture timing for DMA completion is based on a mode value for the block of data. In a first mode for TX channels, timestamp information 134 is captured when TX DMA engine 320 issues the last memory read request for a transfer descriptor. Alternatively, in a second mode for TX channels, timestamp information 134 is captured when TX DMA engine 320 receives data for the last memory read request for a transfer descriptor. Similarly, in a first mode for RX channels, timestamp information 134 is captured when RX DMA engine 330 issues the last memory write request, while in a second mode for RX channels, timestamp information 134 is captured upon completion of the last memory write request. Accordingly, timestamp information 134 can be used to capture different timing aspects of sub-operations within an overall transfer of data between memory 120 and peripherals 150.

Timestamp information 134 is also captured for TX channels when the transfer descriptor size amount of data is transferred from channel data buffers 212 to peripheral interface control circuit 380 (and vice versa for RX channels), and is reported through buffers 350/360. The peripheral completion timestamp capture may be disabled in some implementations for memory-to-memory operations (i.e., operations that do not involve peripherals).

Each channel may implement the peripheral completion timestamp buffer and a counter that keeps track of the number of bytes transferred between intermediate storage buffer 140 and the peripheral interface control circuit 380. When the transfer descriptor is programmed, transfer ID and length fields may be extracted and temporarily stored in the peripheral interface completion buffer. The length field may be read out and compared to a counter that increments as the data is forwarded from TX channel data buffer 212 to the peripheral interface control circuit 380 or from the peripheral interface control circuit 380 to RX channel buffer 214. When the counter reaches the transfer descriptor length, the counter is decremented by the length, and the timestamp is captured and written to the peripheral completion timestamp buffer 350/360. An interrupt can be generated when timestamp information 134 is written to buffer 350/360 based on a capture mode.

Software can read the captured timestamp information 134 via buffers 350 and 360. The timestamp entry may be read by software one data word at a time in some embodiments. When the peripheral completion timestamp buffer is read when empty, it may result in an underflow error and return random data.

Data Structures That May Be Used by the DMA Control Circuit

Transfer Descriptors. In one implementation, a transfer descriptor is made up of four 32-bit data words, as follows:
Data word 3:
TDID[7:0]: Transfer descriptor ID
ATTR[7:0]: Attribute bits:
  Bit 0: Completion interrupt enable
  Bit 1: TD repeat
  Bit 2: CS disable
  Bit 3: Peripheral completion timestamp capture interrupt enable
  Bits 4~7: Reserved
Data word 2:
Length[31:0]: Size of the memory block in bytes
Data words 0 and 1:
Address [N-1:0]: Start address of the memory block.

The address field width, N, is configurable and may be up to 64 bits in one implementation. If length field has a zero value, DMA control circuit 130 may immediately complete the transfer descriptor without any memory access. The address and length may be byte granular. The length in some cases will necessarily be a multiple of the sample size. In case of sample sizes bigger than 16 bits, such as 20 and 24 bits, they may be mapped into 4 bytes. The transfer descriptor ID can be a unique tag that may be assigned by software to keep track the descriptors, and may be used for its completion status.

The attribute is a bit-vector where each bit is associated with a function. Bit 0 specifies whether the completion interrupt needs to be generated when the memory block data transfer is complete. Bit 1 determines whether this transfer descriptor repeats and reused when completed. If set, the repeat bit in the current channel context register is set when the descriptor is loaded and the data transfer specified by this transfer descriptor repeats until the repeat bit is cleared or the channel is disabled. The TD repeat count register reflects the number of iterations. If bit 2, if set, this disables the completion status reporting, i.e. the completion status will not be written to the completion status buffer when completed. Bit 3 specifies whether the peripheral completion timestamp capture interrupt needs to be generated when the timestamp entry is written to the peripheral completion timestamp buffer.

Completion Statuses. In one embodiment, there are two types of completion statuses: one entry that indicates completion of a DMA transfer (for a TX channel, from memory to a channel data buffer 212; for an RX channel, from a channel data buffer 214 to memory), and another entry that indicates completion of a data transfer to/from channel data buffers 212/214 to an interface of a peripheral 150 (for a TX channel, from channel data buffer 212 to the peripheral interface; for an RX channel, from the peripheral interface to channel data buffer 214).

DMA Completion Status. In one implementation, the DMA completion status is a 16-byte memory structure as defined below.
Data word 3:
Transfer Time[23:01: Time taken to complete the transfer descriptor
TDID[7:01: Transfer descriptor ID for this completion status
Data word 2:
CDBL[16:0]: Channel data buffer level
Status[7:01: Completion status code
  Bit 0: 0—successful completion, 1—error
  Bit 1: Timestamp valid
  Bit 2: Reserved
  Bit 3: Channel data buffer underrun for TX or overrun for RX has been detected
  Bit 4~7: Reserved
Data words 1 and 0:
Timestamp[N-1:0]: Timestamp The timestamp and the timestamp valid (status bit 1) are the timestamp and the timestamp_vld input values captured at the TD completion. The channel data buffer level reflects the buffer level at the TD completion. The capture timing is identical to the timestamp. The transfer descriptor ID indicates the corresponding transfer descriptor's TDID. The transfer time, in unit of the timestamp, indicates the amount of time taken to complete the transfer descriptor, i.e., the time difference between when the transfer descriptor is loaded and when the transfer completes. The transfer completion timing aligns with the timestamp capture timing.

Peripheral Completion Status. In one implementation, the peripheral completion timestamp is an 8-byte memory structure as defined below.
Data Word 1:
TDID[7:0]: Transfer descriptor ID for this completion status
V: Timestamp valid
Data Words 1 and 0:
Timestamp[N-1:0]: Timestamp The timestamp and the timestamp valid are the timestamp and the timestamp_vld input values captured at the TD completion on the peripheral interface side of the channel data buffer.

Figure 4A:
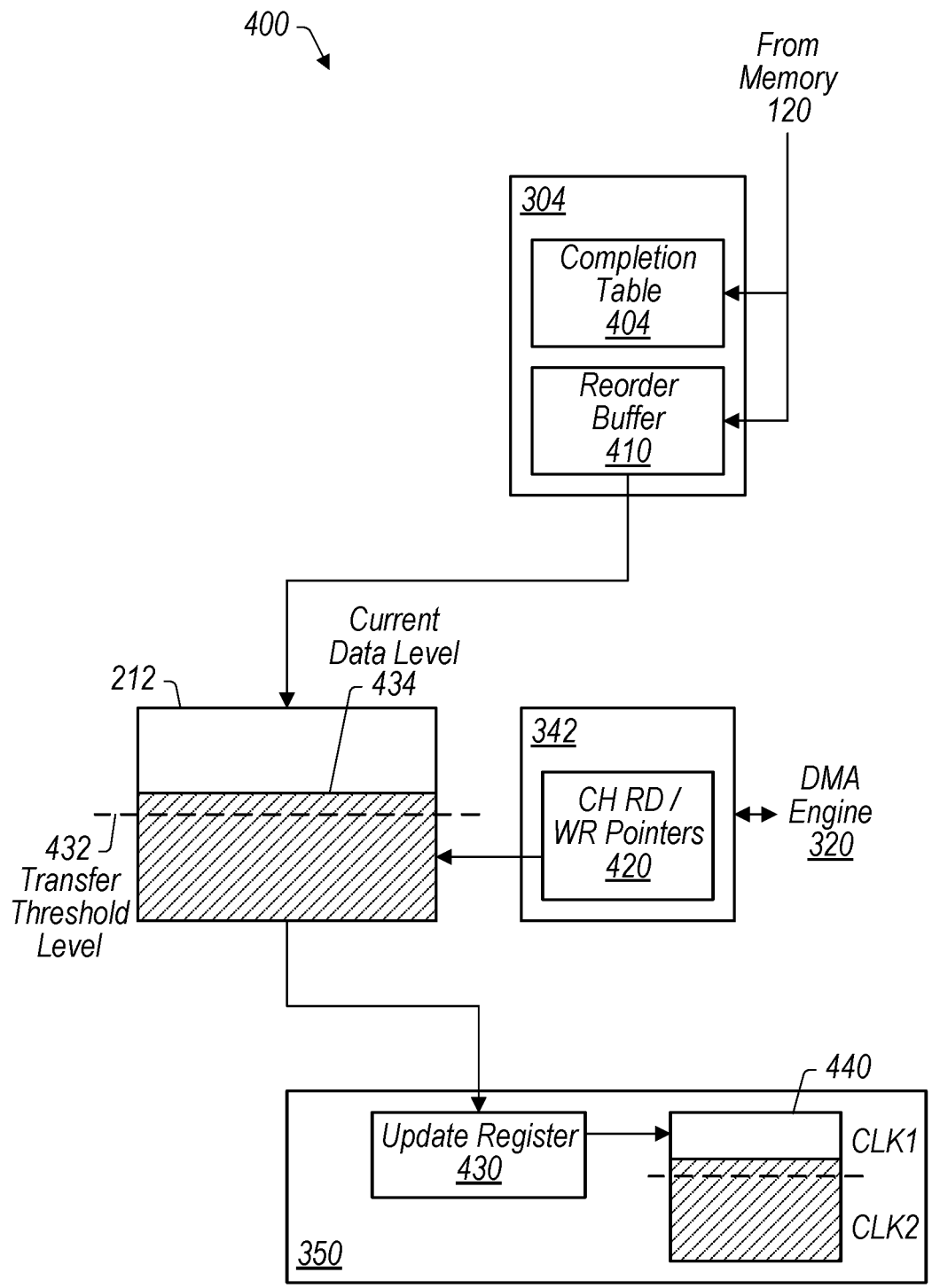
FIG. 4A is a block diagram illustrating one embodiment of a transmit DMA datapath.

FIG. 4A depicts a block diagram illustrating portions of a TX channel datapath. As has been described, TX channels are for communication of data from a sample buffer in memory 120 to a peripheral 150 via intermediate storage buffer 140. The datapath in the depicted embodiment includes memory read interface 304, TX channel buffer manager 340, a channel data buffer 212 within intermediate storage buffer 140, and peripheral interface control circuit 380. The portions of the datapath shown in FIG. 4A may be replicated for other TX channels. As noted, software running on processing circuit 110 creates sample buffers for a channel in memory 120, builds and writes transfer descriptors into transfer descriptor FIFO 350, and enables the DMA channel. When enabled, DMA control circuit 130 steps through the transfer descriptors and performs the DMA transfer by fetching the sample buffer data, storing it in channel data buffer 212, and writing the data from the channel data buffer to peripheral 150. The RX channel datapath is similar to the TX channel datapath depicted in FIG. 4B, but operates in the reverse direction.

In one embodiment, a read request from memory initiated by DMA engine 320 and received by memory read interface 304 may include a TX channel number, a memory address, and a request size in bytes. In response to such a request, memory read interface 304 may allocate an entry in a completion table (not pictured), which may have entries shared by all TX/RX channels. A given entry may include the corresponding TX channel number, an indication of the memory read address, a count value indicating a number of bytes of data that have been transferred, a number of transfer beats, and a timestamp indicating a time of the read request.

As read request data is received from memory 120 by memory read interface 304, the read data is written to reorder buffer 410. Reorder buffer 410 can store multiple lines of data from memory, and thus may be 4 KB in size in some embodiments (allowing thirty two entries of 128B). Accordingly, when data is received by memory read interface 304, data may be written into reorder buffer 410 at the appropriate offset. Upon the last beat of the read data, the completion table's corresponding entry is marked as "data available." Additionally, the saved timestamp at data request time may be compared to the current timestamp in order to determine read latency, which is then reported to configuration registers 310 in some embodiments.

Each TX channel may implement a singly linked list for read data reorder operation. When a read request is generated, the allocated completion lookup table entry number is linked to the tail of that channel's linked list. The head of the linked list points to the entry of the next read data. When a completion lookup table entry pointed by the head pointer is marked as data available, the channel requests that the data be written to channel data buffer 212 from the appropriate reorder buffer slot. When the reorder buffer data is written to channel data buffer 212, this will be reported to DMA engine 320, and the write pointer for channel data buffer 212 will be updated. Additionally, the completion lookup table entry is freed and the channel's head pointer advances to the next entry in the linked list.

Channel data buffer 212 for a given TX channel is associated with stored QoS information that indicates a transfer threshold level 432. For example, level 432 might indicate that the transfer level is at 50% of the total buffer size. A comparison of current data level 434 to transfer threshold level 432 indicates whether additional DMA operations need to be performed. If current data level 434 is below (or equal to, in some cases) transfer threshold level 432, additional DMA operations are initiated to refill channel data buffer 212. On the other hand, if current data level 434 is above (or equal to, in some cases) transfer threshold level 432, DMA operations are suspended until current data level 434 is below transfer threshold level 432. The operation of channel data buffer 212 is discussed more in conjunction with FIG. 4B.

TX channel buffer manager 340 may maintain, for each TX channel, read and write pointers 420 for corresponding channel data buffer 212. The write pointer indicates a current location in buffer 212 to which to write data that is received from memory 120 via memory read interface 304. The read pointer indicates a current location in buffer 212 from which data is to be read when writing to peripheral interface control circuit 380.

Data residing in channel data buffer 212 is transferred to peripheral 150 via peripheral interface control circuit 380 as long as channel data buffer 212 has at least the peripheral transfer data size available (a configuration setting) and the peripheral has requested a data transfer. In one embodiment, each channel implements an unpacking register 430 and peripheral interface buffer 440. From register 430, data may be split into atomic data sizes utilized by peripheral interface buffer 440 and written to that buffer.

Each channel may include an unpacking register and the peripheral interface buffer 440. First, when the channel data buffer has at least the peripheral transfer data size amount available, that is specified by the configuration register, the channel data buffer is read and written to the unpacking register. It is split into the atomic data sizes and is further written to the peripheral interface buffer. The peripheral interface buffer may be an asynchronous FIFO that operates in two different clock domains one utilized by DMA engine 320 and other components, and one utilized by peripherals 150 (at a lower frequency). Buffer 440 may provide a shallow buffering for each channel to minimize peripheral 150's DMA request service latency.

The data in FIFO 440 is transferred to the peripheral when peripheral 150 requests data. The number of writes to the peripheral per peripheral request is programmable in some instances. After the programmed number of write transfers, DMA control circuit may acknowledge the peripheral's request.

Figure 4B:
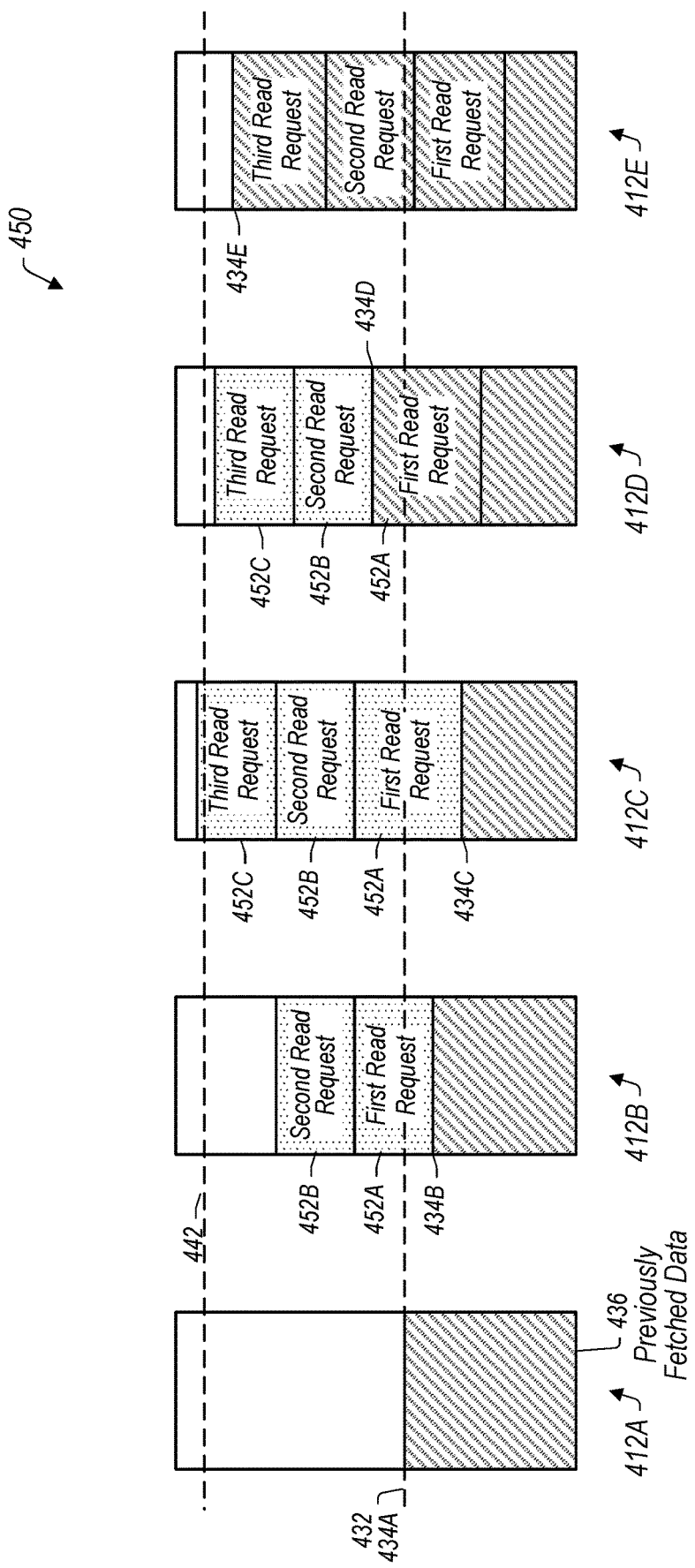
FIG. 4B illustrates use of channel data buffers in a transmit DMA datapath.

FIG. 4B illustrates more detail about the operation of the channel data buffers stored in intermediate storage buffer 140, according to some embodiments. Intermediate storage buffer 140 includes both TX channel data buffers 212 (one for each TX channel) and RX channel data buffers 214 (one for each RX channel). As noted, buffers 212 and 214 may be implemented as FIFO buffers. FIG. 4B shows example 450, in which a single TX channel data buffer 212 is depicted at five different points in time, denoted as 412A-E, to illustrate a buffer refill operation in response to a triggering event.

One type of triggering event for a memory read to refill a TX channel data buffer 212 is when a current data level 434 is below transfer threshold level 432. Note that transfer threshold levels 432 may vary for different channels coupled to different peripherals 150, and may be set accordingly during channel configuration. For example, a peripheral that drains data quickly from a TX channel data buffer 212 may have a transfer threshold level 432 that is closer to the "top" of buffer 212 than a peripheral that drains data more slowly.

An almost-full threshold level 442 may also be utilized in some embodiments for TX channels. (In a corresponding RX channel data buffer 214, there will be an almost-empty threshold level.) Level 442 allows accesses to end at an address boundary that is aligned with the interface to memory 120.

A second type of triggering event for a memory read is when any TX or RX channel triggers for a memory access. This type of access is available in some embodiments if a synchronization mode is enabled. This mode has the benefit of avoiding memory accesses that are scattered in time by gathering all eligible accesses. TX channels whose buffer levels are above the almost-full threshold and RX channels whose buffer levels are below the almost-empty threshold may be excluded from this triggering.

Consider point in time 412A. Channel data buffer 212's current data level 434A is at the transfer threshold level 432. This trigger causes the channel to keep requesting memory reads until the last memory read is made that will, once fulfilled, increment the data level 434 above or equal to the almost-full threshold level 442.

Point in time 412B illustrates that two read requests 452A-B have been made in response to this trigger. These two requests, when fulfilled, do not cause buffer 212 to rise above almost-full threshold level 442. Meanwhile, current data level 434B is slightly lower than level 434A due to data written to the corresponding peripheral 150.

The third read request 452C, which is shown at point in time 412C, becomes the last read request for the channel in response to the trigger since that request, when fulfilled, will make current data level 434C above almost-full threshold level 442, given current data level 434C. When request 452C is made, the channel memory read requests end, even though the read data has yet to be received and the current data level 434C continues to decrement.

Point in time 412D illustrates that when data first read request 452A is received, current data level 434D is now above transfer threshold level 432. Point in time 412E shows current data level 434E after memory request 452C is fulfilled. Absent a trigger of the channel in synchronization mode, the channel will trigger when level 434 again falls below level 432.

Operation of RX channels is similar to that of TX channels. The data transfer on the RX channel is from peripheral 150 to the audio sample buffer in memory 120. The RX channel DMA setup is almost identical to the TX channel: software running on processing circuit 110 creates the audio sample buffer in memory 120, builds and writes the sample buffer's transfer descriptors into DMA control circuit 130, and enables the DMA channel. Going through the descriptors, DMA control circuit performs the DMA transfers by writing the sample buffer with the RX data collected in channel data buffer 214 from peripheral 150.

When enabled, RX channel data buffer 214 is empty initially. As RX data is read from peripheral 150 and stored in channel data buffer 214, the channel data buffer level increments. When the channel data buffer level 434 reaches the transfer threshold level 432, the channel is triggered to request memory writes to empty the buffer.

Analogous to the TX channel, each RX channel may have a packing register and an asynchronous peripheral interface buffer. When the peripheral requests an RX data transfer, the peripheral controller may perform a programmed number of read transfers. Each read transfer data may contain one sample; the unpacked data is then written to a peripheral interface buffer within peripheral interface control circuit 380.

As long as the peripheral interface buffer is not empty, the buffer is read and a sample is written into the packing register. When the packing register holds the minimum unload size bytes specified by a configuration register, it is requested to be written to channel data buffer 214. The process repeats as long as the RX channel is enabled.

The channel data buffer level increments as RX channel data buffer 214 is written by the peripheral interface control circuit 380. When the data level reaches the transfer threshold, the RX channel DMA transfer is triggered. (The RX channel DMA transfer may also be triggered when the channel data buffer level reaches the remaining transfer size of the current transfer descriptor even if it is below the transfer threshold.) As described relative to the TX channel DMAs, other TX or RX channels triggering can also trigger an RX channel to perform memory writes.

The RX channel memory write operates to empty channel data buffer 214. It may require one or multiple write requests depending on the current buffer level at trigger and the remaining DMA transfer size. The last write request is the one that brings the channel data buffer level below the almost empty threshold. As soon as the last write request is issued, before the write response is received, the channel memory write request stops until the next triggering event.

Figure 5:
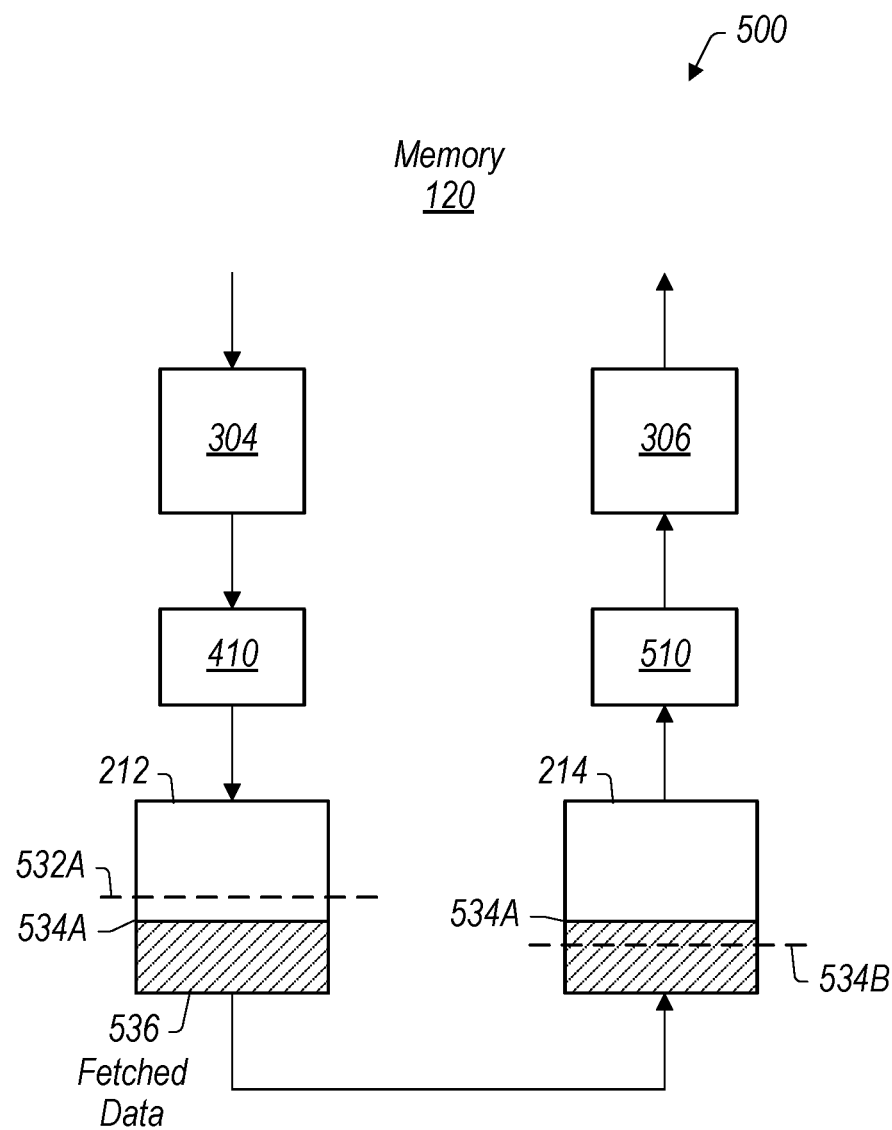
FIG. 5 illustrates the use of a DMA control circuit to perform memory-to-memory DMA operations.

FIG. 5 illustrates that DMA control circuit 130 may also be used to support memory-to-memory DMA operations via a datapath 500. As shown, this datapath includes memory read interface 304, reorder buffer 410, TX channel data buffer 212, RX channel data buffer 214, align buffer 510, and memory write interface 306. Peripheral interface control circuit 380 is not active during memory-to-memory operations.

In the memory-to-memory DMA operation, DMA engine 320 (not pictured) causes data to be read from memory 120 via memory read interface 304. As data is retrieved from memory, it is stored in reorder buffer 410, where it is subsequently aligned and written to TX channel data buffer 212. As shown, TX channel data buffer 212 has a transfer threshold level 532A, and a current data level 534A indicating currently fetched data. Because peripheral interface control circuit 380 is not involved, data stored in TX channel data buffer 212 may be immediately forwarded to RX channel data buffer 214 as long as that buffer has space available. DMA engine 330 (not pictured) operates to write aligned data to memory 120 via align buffer 510 and memory write interface 306 when current data level 534B is above transfer threshold level 532B. Note that level 532B may be set to a relatively low threshold in order to speed up the write to memory 120. In some embodiments, the TX and the RX channels do not participate in memory access synchronization when performing memory-to-memory DMA operations.

Figure 6:
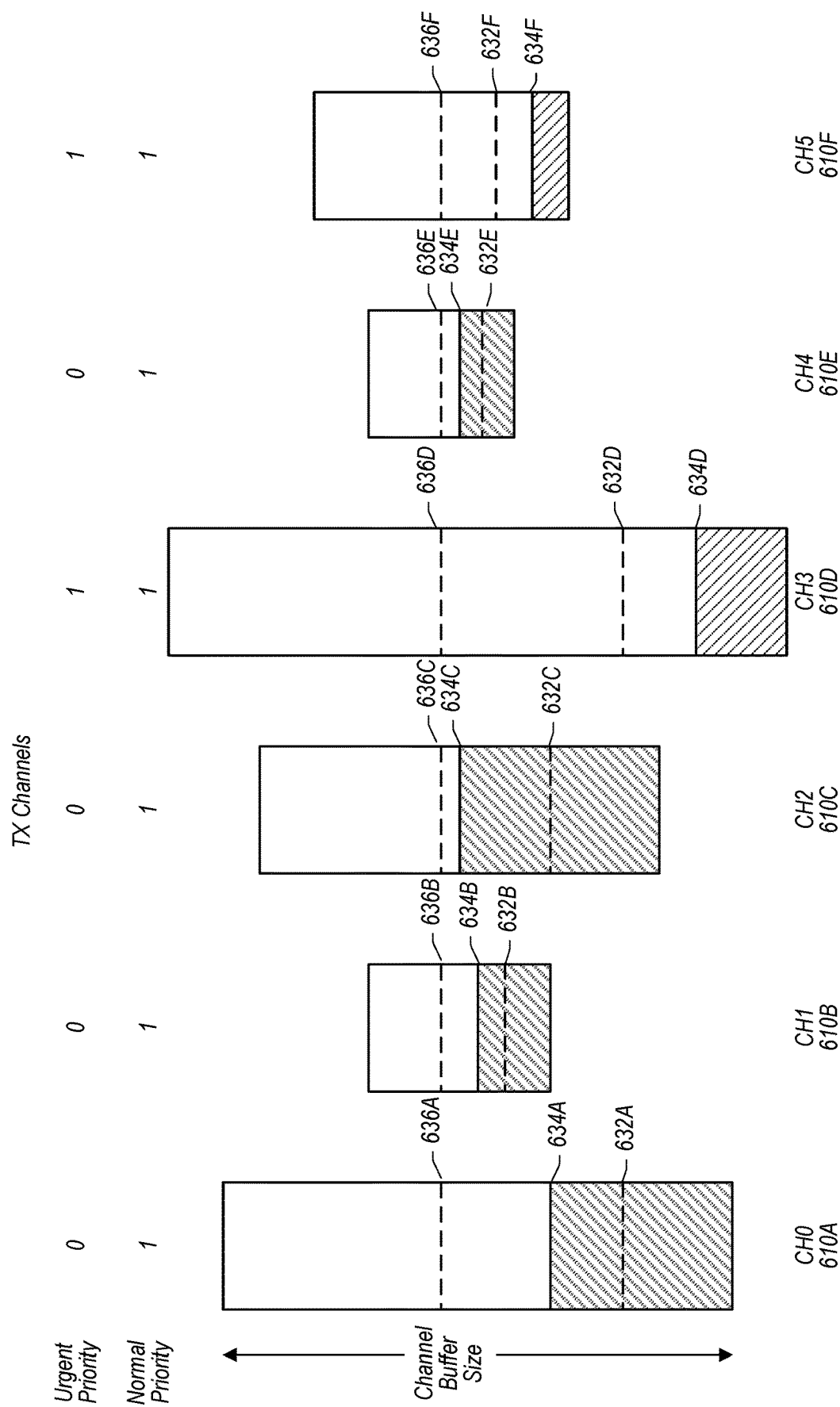
FIG. 6 illustrates the use of a two-tiered arbitration scheme to service multiple transmit channels.

FIG. 6 illustrates the use of one possible arbitration scheme by DMA control circuit 130. As noted, DMA control circuit 130 is configured to support multiple TX and RX channels, more than one of which may be seeking to access memory 120 at a given time. Accordingly, DMA control circuit 130 may, for a current arbitration cycle, select both a TX channel and an RX channel to be granted access to the memory. In one embodiment, arbitration functionality may be implemented within DMA engines 320 and 330.

Example 600 illustrates six TX channels 0-5, indicated by reference numerals 610A-F. Each of these channels has a respective buffer size, a respective urgent priority threshold level 632A-F, a respective current buffer data level 634A-F, and a respective transfer threshold level 636A-F. In general, TX channels having a current buffer data level 634 that is below the respective transfer threshold levels 636 are triggered for DMA and need to be arbitrated. In example 600 shown in FIG. 6, all six channels are triggered for DMA. Furthermore, those TX channels having a current buffer data level 634 that is below the respective urgent priority threshold level 632 are considered to have priority relative to those TX channels having a current buffer data level 634 that is above the respective urgent priority threshold level 632 for that channel. These channels can be said to be "prioritized"

relative to other channels, or that they have an "urgent" priority relative to channels having a "normal" priority. It can be seen that in example 600, channels 3 and 5 (corresponding to reference numerals 610D and 610F) have an urgent priority relative to channels 0, 1, 2, and 4, which have a normal priority. In one implementation, the TX channel data buffer level 634 includes both the currently fetched data as well as read requests that have not yet been fulfilled; level 634 is decremented when read data is actually received.

In one embodiment, DMA control circuit 130 implements a two-tier arbitration scheme for TX and RX channels. During a given arbitration round, those TX channels that have current data buffer level 634 below their respective transfer threshold levels 632 are considered to be in the urgent priority class. In a given round of arbitration, one of the channels is selected and requests a number of memory trans actions—this number may be based on the channels' programmed arbitration weights in some implementations. (In some embodiments, a given channels may perform 1-8 memory burst transactions upon winning an arbitration round). In successive arbitration rounds, remaining urgently prioritized channels may be serviced in round-robin fashion before any of the normally prioritized channels. As a particular TX channel's data buffer level rises above the transfer threshold level, that channel is demoted to the normal priority class. When there are no more urgent priority class channels, all channels (which are now all normal priority) may be serviced in round-robin fashion.

In this manner, DMA control circuit 130 can prioritize which TX channels are to be granted access to memory 120, doing so in a way that minimizes the chance of any individual channel being starved. This paradigm, in conjunction with channel arbitration weights, helps enforce specified quality of service parameters, and prevents TX channel underrun. RX arbitration may be performed independent of TX arbitration in a similar fashion.

Figure 7:
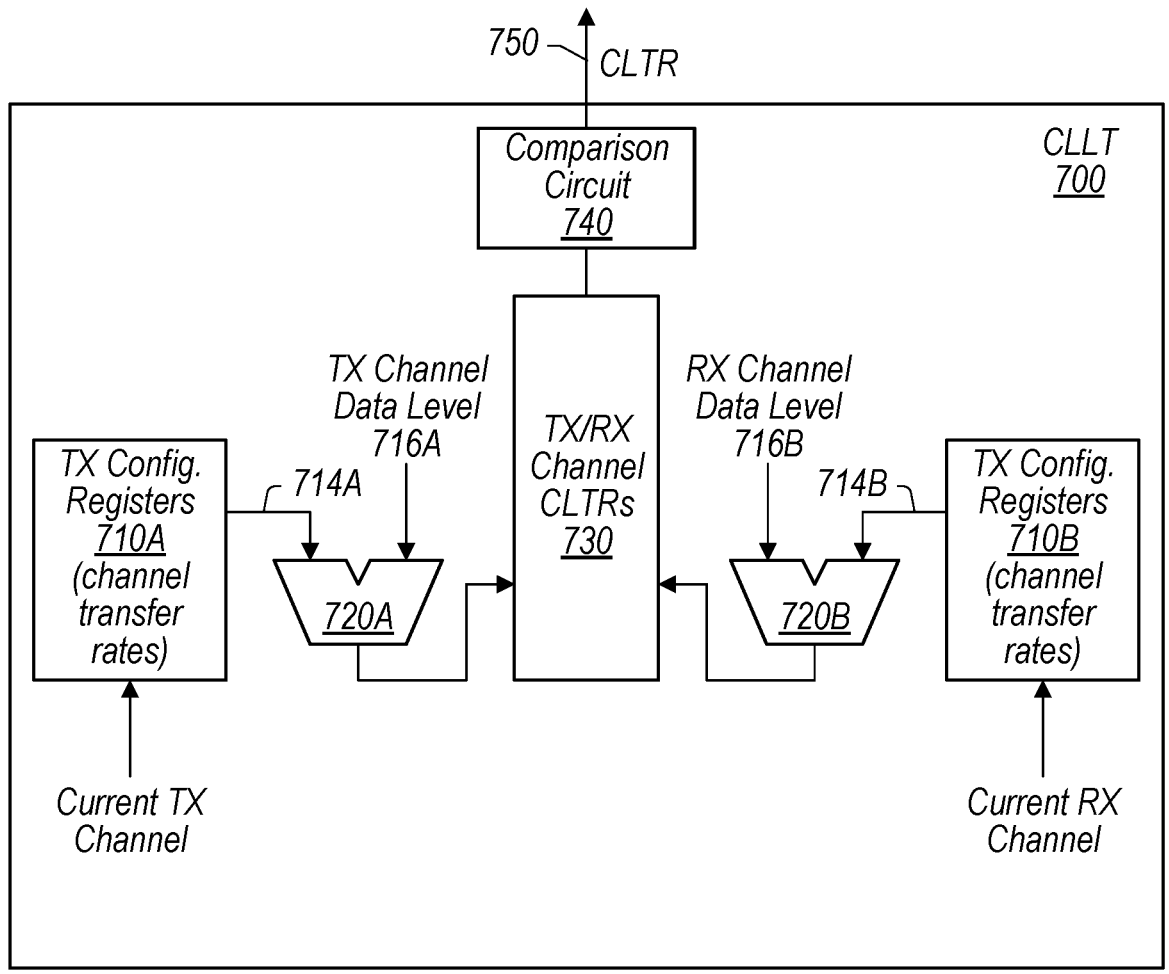
FIG. 7 is a block diagram of an embodiment of a closed-loop latency tolerance circuit that may be used to set a priority value for memory accesses.

FIG. 7 illustrates a block diagram of one embodiment of CLLT circuit 700, which corresponds to CLLT circuit 132 depicted in FIG. 1. In the illustrated embodiment, CLLT circuit 700 includes TX channel transfer rate registers 710A, RX channel transfer rate registers 710B, multipliers 720A-B, current latency tolerance (CLTR) registers 730, and comparison circuit 740. CLLT circuit 700 receives, from DMA engines 320 and 330 respectively, indications of which TX and RX channels have won a current arbitration round. In turn, CLLT circuit 700 outputs CLTR values 750 for TX and RX channels. CLTR values 750 may be provided to various components within system 100, which may ultimately result in changes in priority for DMA control circuit 130 for accesses to memory 120.

The purpose of CLLT circuit 700 is to provide an indication of the current latency tolerance of the TX and RX channels handled by DMA control circuit 130. As used in this disclosure, "latency tolerance" refers to an amount of memory latency that DMA control circuit 130 can handle, or tolerate, before an exception condition occurs for one of the channel data buffers. For example, consider a TX channel for which the corresponding peripheral takes 83 μs to transfer 4B of data from channel data buffer 212 to the peripheral via peripheral interface control circuit 380. If this TX channel has 8B of data remaining in corresponding buffer 212, then this channel currently has a latency tolerance of 8B*83 μs/4 B, or 166 μs, meaning that unless buffer 212 is refilled from memory within 166 μs, the buffer will run out of data and an underrun exception will occur.

In one embodiment, the current latency tolerance (or CLTR) 750 output by CLLT circuit 700 specifies the shortest amount of time amongst all active TX channels (and separately for RX channels) until a buffer exception condition exists. For the TX channels, the buffer exception corresponds to an underrun, meaning that the peripheral has drained data from the TX channel data buffer. The CLTR value for a TX channel may be indicated by an amount of time until the channel data buffer is empty; accordingly, data needs to be retrieved from memory 120 in that time frame to continue normal operation. Similarly, for the RX channels, the buffer exception is an overrun, meaning that the peripheral has completely filled the RX channel data buffer. The CLTR value for an RX channel may be indicated by an amount of time until the channel data buffer is full; accordingly, data needs to be written to memory 120 in that time frame to continue normal operation. Alternately, in other embodiments, CLTR values 750 may indicate one of a set priority levels, which may be preassigned to various latency ranges. In either event, by outputting CLTR values 750, which corresponds to the current TX and RX channels with the least latency tolerance (i.e., the least amount of time until a channel data buffer exception), system 100 can appropriately prioritize requests from DMA control circuit 130 relative to other requesting entities or memory calibration operations.

Generally speaking, CLLT circuit 700 allows DMA control circuit 130 to control the timing of DMA transfers between sample buffers in memory 120 and intermediate storage buffer 140, doing so based on data levels of channel data buffers within intermediate storage buffer 140 as well as stored QoS information. One example of stored QoS information may be stored in registers 710A and 710B. Registers 710 may store, for each TX and RX channel, a target transfer rate for the channel. In some cases, this may be expressed as the time in microseconds that it takes to transfer 4 bytes. In the case of the TX channels, this will be the time to transfer buffer data to the peripheral, and in the case of the RX channels, this will be the time to transfer buffer data from the peripheral. Note that in some embodiments, registers 710 may be stored as part of configuration registers 310, but for convenience of explanations, these registers are shown as part of CLLT circuit 700. The transfer rates stored in registers 710 may be programmed by software upon the creation of a particular TX/RX channel.

After channel transfer rates have been set up for various TX/RX channels, CLLT circuit 700 receives indications 712A-B, which specify the TX/RX channels that have been selected during the current TX/RX arbitration cycle. These indications are used to select a corresponding one of registers 710, which causes the contents of that register 714 (i.e., the channel transfer rate) to be output to multiplier 720. Each multiplier 720 may also receive an indication 716 of the channel data level of the selected TX/RX channel. Multiplier 720A receives an indication of the number of bytes currently stored in the channel data buffer for the TX channel indicated by 712A. Similarly, multiplier 720B receives an indication of the amount of empty space in the channel data buffer indicated by 712B. Note that the "channel data level" has a different connotation for TX vs. RX channels. Because the concern for TX channels is the peripheral emptying data from the channel data buffer (underrun), the channel data level indicates the amount of data (e.g., the number of bytes) in the buffer. Accordingly, multiplying the TX transfer rate by the amount of data in the buffer yields the amount of time until the buffer is empty, assuming there is no memory access to refill the TX channel data buffer. On the other hand, because the concern for RX channels is the peripheral filling up the channel data buffer (overrun), the channel data level indicates the amount of empty space (e.g., the number of bytes) in the buffer. Accordingly, multiplying the RX transfer rate by the amount of empty space in the buffer yields the amount of time until the buffer is full, assuming there is no memory access to write data from the buffer to memory (and thus reduce the amount of data residing in the buffer).

Multipliers 720 thus output the CLTR values 722 for the currently selected TX and RX channels to CLTR registers 730. In one embodiment, CLTR registers 730 store the current latency tolerance values for active TX and RX channels. As noted, DMA control circuit 130 may implement an arbitration scheme that includes a round-robin component. As such, the CLTR value for each TX/RX channel may be periodically updated. With current latency tolerance values stored in registers 730 for each channel, comparison circuit 740 is configured to output the minimum of these TX and RX channel CLTR values as CLTR values 750. In this manner, DMA control circuit 130 indicates to system 100 the current latency tolerance of the active TX and RX channels that are closest to having a buffer exception. This mechanism helps prevent a scenario in which the highest prioritized DMA channels are nonetheless blocked from accessing memory 120. DMA control circuit 130 thus uses CLTR value 750 to signal to components of system 100 (e.g., a power manager circuit) the current ability of circuit 130 to tolerate delays in being able to access memory 120. CLTR values 750 may thus be used to indicate a priority of DMA control circuit for accesses to memory 120.

Figure 8:
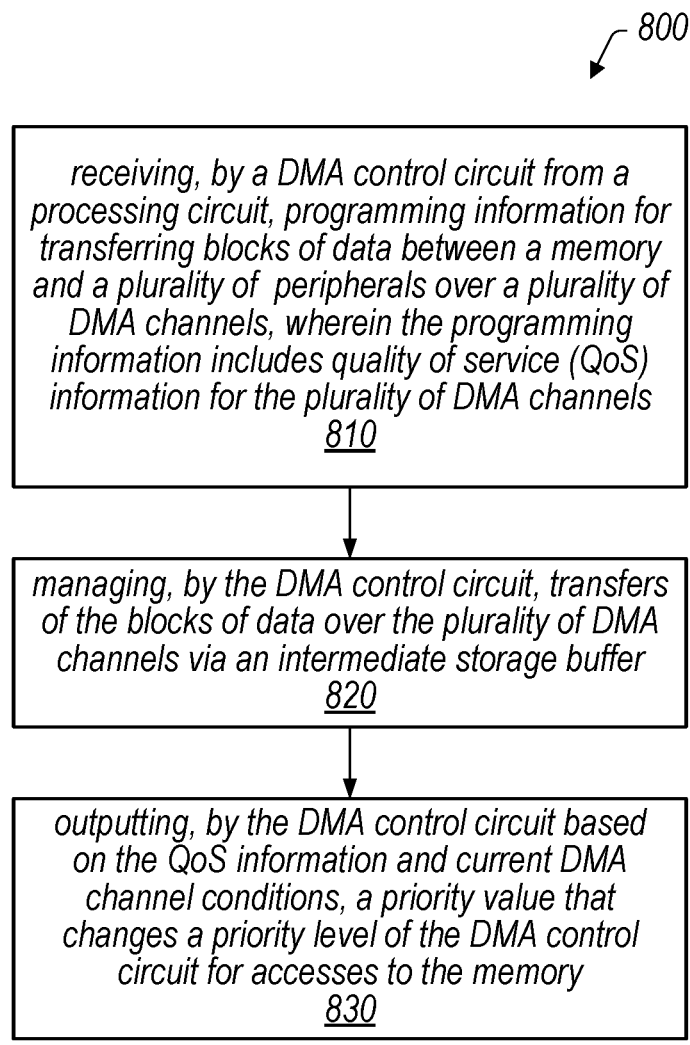
FIG. 8 is a flow diagram illustrating an example method for managing a DMA transfer.

Turning now to FIG. 8, a flowchart of a method for facilitating a DMA transfer is shown. Method 800 is performed by a DMA control circuit—that is, circuitry that is configured to control a DMA transfer between memory and an intermediate storage buffer, as well as a data transfer between the intermediate storage buffer and a peripheral. In one embodiment, the DMA control circuit may be one component of a system-on-a-chip.

Method 800 begins at 810, in which the DMA control circuit receives programming information or transferring blocks of data between a memory and a plurality of peripherals over a plurality of DMA channels. As previously discussed, programming information thus includes any type of configuration information used to set up the channel or control a property of the channel, as well as transfer descriptors that specify a location of data in a sample buffer in memory 120. Certain programming information can be referred to as "QoS information" if it relates to a property of the prioritization of the channel data. Target channel data rate and a threshold level for a channel data buffer in the intermediate storage buffer constitute two types of QoS information.

The concept of a DMA channel has been described throughout this disclosure, including with respect to FIG. 2. In some embodiments, various ones of the DMA channels are used to transmit audio data to/from audio peripherals. But this disclosure is to be understood to encompass DMA control of various types of data including audio. In particular, the disclosed techniques are particularly well-suited for the transmission of "real-time" peripheral data, including audio, as well as other types of data such as haptic data.

In 820, method 800 includes the DMA control circuit managing transfers of the blocks of data over the plurality of DMA channels via the intermediate storage buffer, which may be a separate circuit from the DMA control circuit in some embodiments. This managing includes facilitating DMA operations between memory and the intermediate storage buffer and data transfers between the intermediate storage buffer and interfaces to various ones of the peripherals. Transmit and receive channels may be managed independently in various embodiments. The intermediate storage buffer may include constituent channel data buffers for each TX and RX channel. Each channel data buffer may be implemented as a FIFO data buffer in some implementations.

The managing performed by the DMA control circuit includes controlling the timing of data transfers over the various DMA channels, and may take various forms. For example, in 830, method 800 includes outputting a priority value that changes a priority level of the DMA control circuit for accesses to the memory. This priority value is determined based on QoS information for the channel, as well as current DMA channel conditions. In one embodiment, current DMA channel conditions for a particular DMA channel include such information as the current data level of the channel data buffer (e.g., the FIFO) within intermediate storage buffer 140. This priority value may be set as described with respect to FIG. 7. The priority value may be indicative of a minimum current latency tolerance value of enabled ones of the plurality of DMA channels, where the current latency tolerance value for a given DMA channel corresponds to an amount of time until a channel data buffer exception will occur if no memory access is provided to the given DMA channel. For TX channels, the relevant exception is a buffer underrun, while for RX channels it is a buffer overrun.

Such a priority value may be desirable because even if a particular DMA channel is prioritized relative to other DMA channels handled by DMA control circuit 130, the particular DMA channel still might fail to meet quality of service parameters due to external factors, such as the priority given to DMA control circuit 130 by memory 120. Stated another way, DMA control circuit 130 may have trouble getting access to memory 120 for a particular channel, even if that channel is urgently prioritized relative to other DMA channels. This may be caused by other requesting devices seeking access to memory 120, or by memory calibration operations. The priority value may be output by DMA control circuit 130 as a way to indicate to memory 120 that circuit 130 needs increased priority in order to meet the specified quality of service for a particular DMA channel.

Method 800 can operate on various types of data. In many cases, the system in which method 800 operates may have stringent timing requirements for the data being processed over various ones of the DMA channels. In some cases, this data may be referred to as "real-time" data. In the broadest sense, real-time data means that data is transmitted between two points in a computer system as quickly as it gathered, without being stored for any significant period of time. Of course, real-time data is not transmitted instantly, and as described above in the context of the present disclosure, there is temporary buffering in intermediate storage buffer 140 as data travels between memory 120 and peripherals 150. But QoS information associated with real-time data channels in the present disclosure is set such that the intervening hardware attempts to manage the flow of data in a way that meets these timing parameters.

One type of data that can broadly be considered to be a category of real-time data is audio data, such as data associated with audio peripherals, such as headsets, speakers, microphones, etc. When audio data is being handled, method 800 involves transferring blocks of audio data between memory 120 and audio peripherals within peripherals 150 and managing transfers of the blocks of audio data over the plurality of DMA channels via intermediate storage buffer 140. Transfer of audio data can be said to be isochronous, meaning that data is transmitted regularly at a desired rate. Isochronous data transfer thus involves close timing coordination between data source and destination, which is particularly important for audio data.

In various embodiments, method 800 may include additional operations, including those related to arbitration. For example, managing 820 may include determining that two or more DMA channels are in a prioritized class based on a comparison of current data levels to threshold levels of channel data buffers within the intermediate storage buffer, and arbitrating between the two or more prioritized DMA channels. This arbitrating may be performed separately for both transmit and receive DMA channels in various embodiments. For TX channels, a channel may be prioritized if a current data level is less than (or less than or equal to) its threshold level, meaning that additional memory reads are needed in order to refill the channel data buffer until it is above its threshold level. Conversely, an RX channel may be prioritized if its current data level is greater than (or greater than or equal to) its threshold level, meaning that additional memory writes are needed to empty the channel data buffer until it is below its threshold level.

In some embodiments, memory access synchronization is supported to eliminate frequent memory access among DMA channels (and thus save power). In such embodiments, method 800 may include determining that at least one DMA channel is in a prioritized class based on a comparison of current data levels to transfer threshold levels of channel data buffers, and in response, servicing requests for active DMA channels. In this manner, a trigger on one channel can service all other channels—both TX and RX.

Method 800 may additionally include handling timestamp information. For example, method 800 may further include storing, by the DMA control circuit for a given DMA channel, timestamp information for transfer of a particular block of data. Generally speaking, timestamp information may include timing information relating to sub-operations involved in transferring data from the memory to different ones of the plurality of peripherals. For example, the timestamp information may separately indicate 1) when a DMA between the memory and the intermediate storage buffer is complete, and 2) when a data transfer between the intermediate storage buffer and a peripheral interface is complete. But it is contemplated that other types of timestamp information may also be captured for example, when a DMA transfer is 50% completed, or when a data transfer between the intermediate storage buffer and a particular peripheral interface begins (in addition to when such data transfer is complete). Once timestamp information is captured, method 800 may further include receiving, by the DMA control circuit from the processing circuit, a request for the timestamp information for the transfer of a particular block of data, and outputting, by the DMA control circuit, the timestamp information to the processing circuit so that the timestamp information can be used to inform further software processing.

Figure 9:
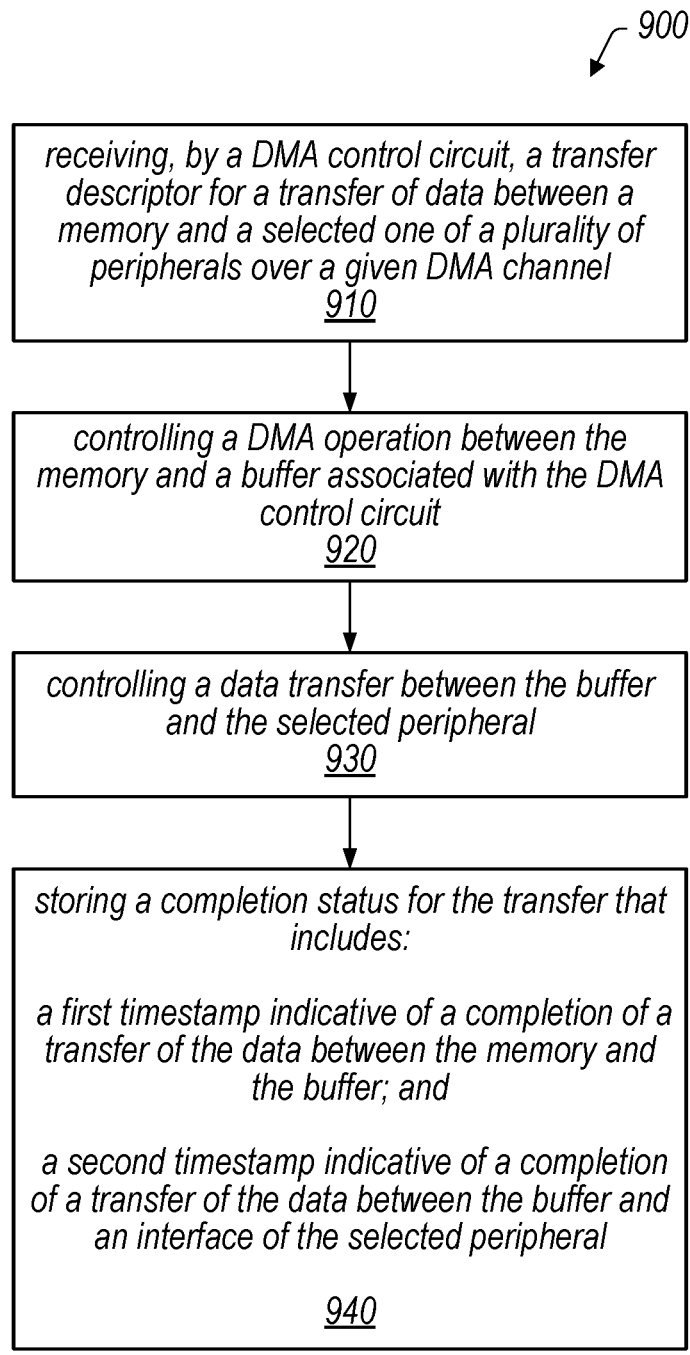
FIG. 9 is a flow diagram illustrating another example method for managing a DMA transfer.

FIG. 9 illustrates a flowchart of a method for capturing timestamp information during a DMA. This timestamp information may be accessible by software operating on the data. The accessibility of this data may in turn result in improved software performance.

Method 900 may be performed by a circuit such as DMA control circuit 130, which may be one component of a system-on-a-chip. Method 900 may be performed on a variety of types of data, including audio data. Method 900 commences with 910, in which a DMA control circuit receives a transfer descriptor such as that described above. The transfer descriptor may include parameters to facilitate a transfer of data between a memory and a selected one of a plurality of peripherals over a given DMA channel. This transfer may be a transmit operation or a receive operation.

In 920 and 930, the audio transfer circuit controls portions of the transfer. In 920, the DMA control circuit controls a DMA operation between the memory and a buffer within an intermediate storage buffer. This buffer may be in or accessible to the DMA control circuit (e.g., in an SRAM coupled to the DMA control circuit). This buffer is associated with the transfer channel in some way. For example, if a transmit operation is occurring over channel 3, the DMA operation will include writing data from memory to the buffer such that the locations that are written are indicated as being associated with channel 3. In 930, the DMA control circuit controls a data transfer between the buffer and the selected peripheral.

In a transmit operation, 920 occurs before 930. In a receive operation, 930 occurs before 920. In either case, upon completion of these various operations, the DMA control circuit stores a completion status for the transfer in 940. This completion status includes timestamp information that provides timing information for the operations of 920 and 930. Specifically, a first timestamp is recorded that indicates a time of completion of the DMA between memory and the buffer associated with the transfer. Additionally, a second timestamp is recorded that indicates a completion of a transfer of the audio data between the buffer and the selected peripheral. In some cases, "completion" of this transfer refers to a time at which the last portion of the audio data is written to a bus interface between the DMA control circuit and the peripheral. This timestamp information allows software operating on the data to have visibility about the timing of sub-operations that occur in the channel between memory and the peripheral.

Example Device

Figure 10:
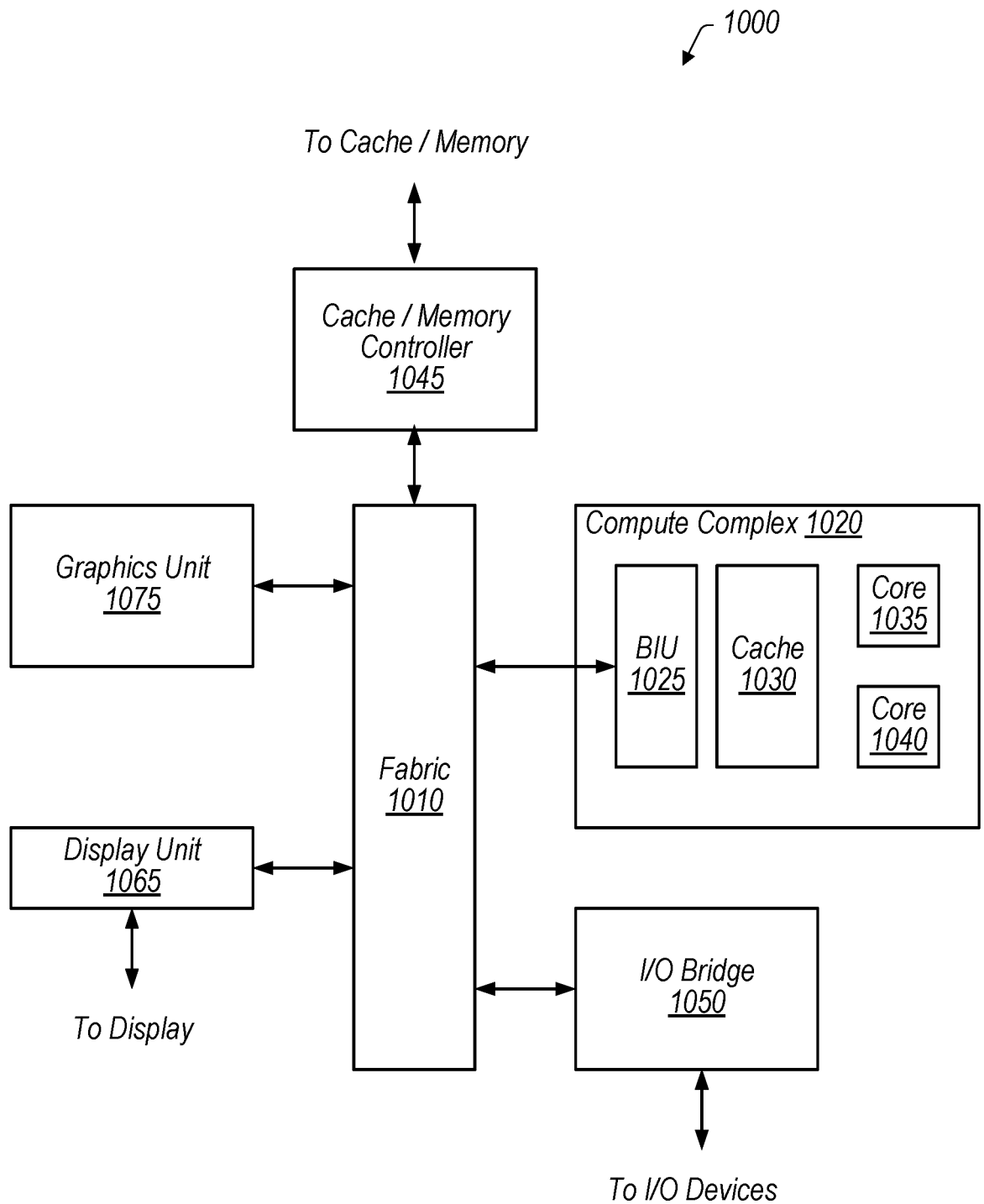
FIG. 10 is a block diagram illustrating an example computing device that can include circuits to implement techniques disclosed herein.

Turning now to FIG. 10, a block diagram illustrating an example embodiment of a device 1000 is shown. In some embodiments, elements of device 1000 may be included within a system on a chip. In some embodiments, device 1000 may be included in a mobile device, which may be battery-powered. Therefore, power consumption by device 1000 may be an important design consideration. In the illustrated embodiment, device 1000 includes fabric 1010, compute complex 1020 input/output (I/O) bridge 1050, cache/memory controller 1045, graphics unit 1075, and display unit 1065. In some embodiments, device 1000 may include other components (not shown) in addition to or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and caches. For example, compute complex 1020 may include 1, 2, or 4 processor cores, or any other suitable number. In one embodiment, cache 1030 is a set associative L2 cache. In some embodiments, cores 1035 and 1040 may include internal instruction and data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions.

Cache/memory controller 1045 may be configured to manage transfer of data between fabric 1010 and one or more caches and memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches.

As used herein, the term "coupled to" may indicate one or more connections between elements, and a coupling may include intervening elements. For example, in FIG. 10, graphics unit 1075 may be described as "coupled to" a memory through fabric 1010 and cache/memory controller 1045. In contrast, in the illustrated embodiment of FIG. 10, graphics unit 1075 is "directly coupled" to fabric 1010 because there are no intervening elements.

Graphics unit 1075 may include one or more processors, e.g., one or more graphics processing units (GPU's). Graphics unit 1075 may receive graphics-oriented instructions, such as OPENGL®, Metal, or DIRECT3D® instructions, for example. Graphics unit 1075 may execute specialized GPU instructions or perform other operations based on the received graphics-oriented instructions. Graphics unit 1075 may generally be configured to process large blocks of data in parallel and may build images in a frame buffer for output to a display, which may be included in the device or may be a separate device. Graphics unit 1075 may include transform, lighting, triangle, and rendering engines in one or more graphics processing pipelines. Graphics unit 1075 may output pixel information for display images. Graphics unit 1075, in various embodiments, may include programmable shader circuitry which may include highly parallel execution cores configured to execute graphics programs, which may include pixel tasks, vertex tasks, and compute tasks (which may or may not be graphics-related).

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and low-power always-on functionality, for example. I/O bridge 1050 may also include interfaces such as pulse-width modulation (PWM), general-purpose input/output (GPIO), serial peripheral interface (SPI), and inter-integrated circuit (I2C), for example. Various types of peripherals and devices may be coupled to device 1000 via I/O bridge 1050, including audio peripherals. In particular, embodiments of a DMA control circuit such as DMA control circuit 130 may be coupled to or included in I/O Bridge 1050 in various implementations.

In some embodiments, device 1000 includes network interface circuitry (not explicitly shown), which may be connected to fabric 1010 or I/O bridge 1050. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1000 with connectivity to various types of other devices and networks.

Example Applications

Figure 11:
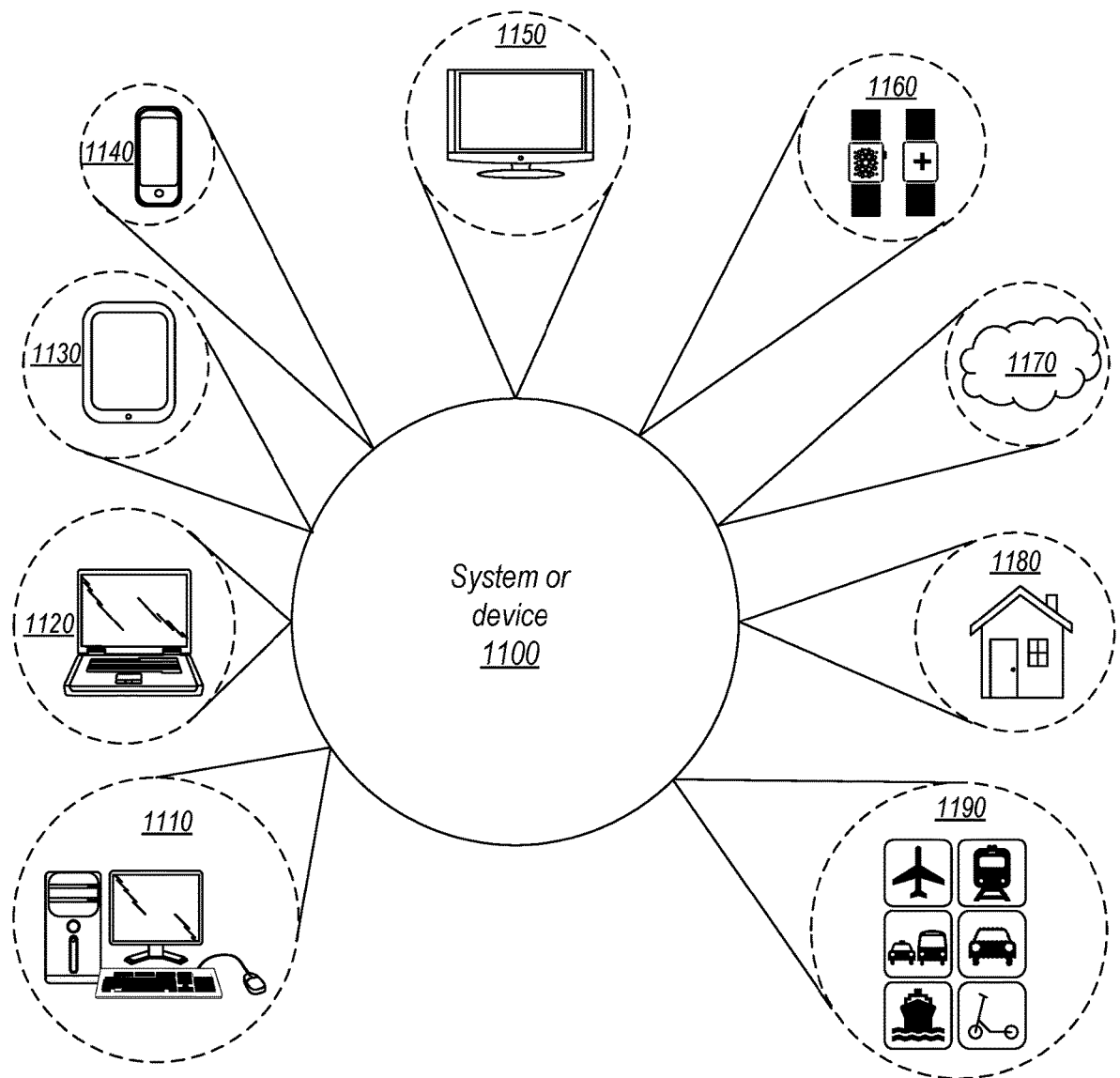
FIG. 11 is a diagram illustrating example applications of disclosed systems and devices.

Turning now to FIG. 11, various types of systems that may include any of the circuits, devices, or system discussed above. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 12:
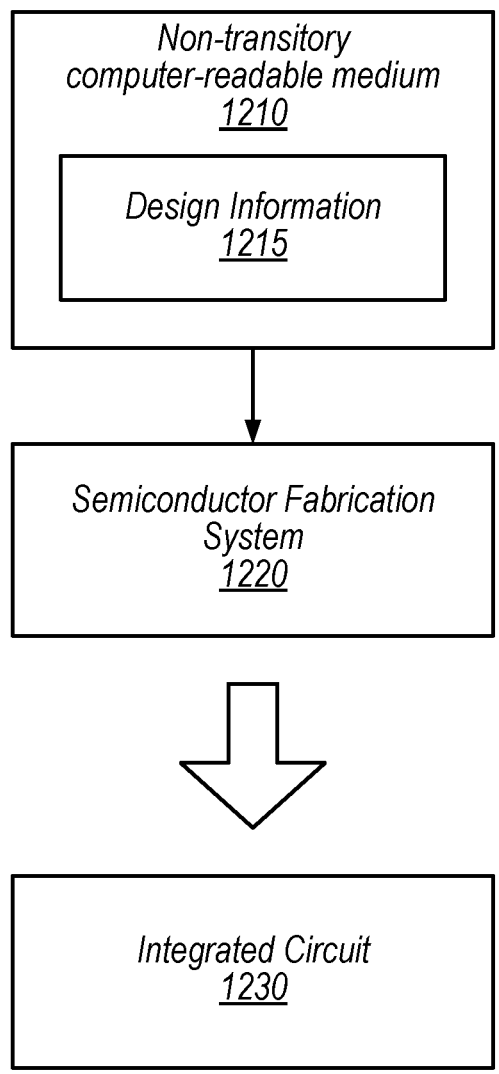
FIG. 12 is a block diagram illustrating an example non-transitory computer-readable medium that can store design information for circuits disclosed herein.

FIG. 12 is a block diagram illustrating an example non-transitory computer-readable storage medium that stores circuit design information, according to some embodiments. In the illustrated embodiment, semiconductor fabrication system 1220 is configured to process the design information 1215 stored on non-transitory computer-readable medium 1210 and fabricate integrated circuit 1230 based on the design information 1215.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1210 may include other types of non-transitory memory as well or combinations thereof. Non-transitory computer-readable storage medium 1210 may include two or more memory mediums which may reside in different locations, e.g., in different computer systems that are connected over a network.

Design information 1215 may be specified using any of various appropriate computer languages, including hardware description languages such as, without limitation: VHDL, Verilog, SystemC, SystemVerilog, RHDL, M, MyHDL, etc. Design information 1215 may be usable by semiconductor fabrication system 1220 to fabricate at least a portion of integrated circuit 1230. The format of design information 1215 may be recognized by at least one semiconductor fabrication system 1220. In some embodiments, design information 1215 may also include one or more cell libraries which specify the synthesis, layout, or both of integrated circuit 1230. In some embodiments, the design information is specified in whole or in part in the form of a netlist that specifies cell library elements and their connectivity. Design information 1215, taken alone, may or may not include sufficient information for fabrication of a corresponding integrated circuit. For example, design information 1215 may specify the circuit elements to be fabricated but not their physical layout. In this case, design information 1215 may need to be combined with layout information to actually fabricate the specified circuitry.

Integrated circuit 1230 may, in various embodiments, include one or more custom macrocells, such as memories, analog or mixed-signal circuits, and the like. In such cases, design information 1215 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements disclosed herein. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed field-programmable gate array (FPGA), for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
  a processor circuit configured to execute software that is configured to initiate transfers of audio data; and
  an audio transfer circuit configured to transfer the audio data between a memory circuit and ones of a plurality of audio peripherals, wherein, for a given transfer of a set of audio data between the memory circuit and a selected one of the plurality of audio peripherals, the audio transfer circuit is configured to:
    store a first timestamp indicative of a first point in time when a first intermediate transfer of the set of audio data from the memory circuit to a particular buffer in the audio transfer circuit completes; and store a second timestamp indicative of a second point in time when a second intermediate transfer of the set of audio data from the particular buffer to the selected audio peripheral completes;

wherein the processor circuit is further configured to schedule a subsequent transfer of a different set of audio data based on differences between the first and second timestamps.

2. The apparatus of claim 1, wherein, the processor circuit is further configured to use the first and second timestamps to to reduce latency of data transfers between the memory circuit and the selected audio peripheral.

3. The apparatus of claim 1, wherein, for a transfer from the selected audio peripheral to the memory circuit, the second timestamp is indicative of a completion of a data transfer from the selected audio peripheral to the particular buffer and the first timestamp is indicative of a completion of a data transfer from the particular buffer to the memory circuit.

4. The apparatus of claim 1, wherein the first timestamp is stored in first completion status data structure that includes fields for a transfer id, a completion code, a data level in the particular buffer, and the first timestamp, and wherein the second timestamp is stored in a second completion data structure that includes fields for the transfer id and the second timestamp.

5. The apparatus of claim 1, wherein the audio transfer circuit includes a configurable number of transfer channels, and wherein the particular buffer is a transmit channel data buffer shared by all transmit transfer channels of the audio transfer circuit.

6. The apparatus of claim 5, wherein the audio transfer circuit is further configured to:

in response to a determination that an amount of data buffered for a particular transfer channel satisfies a threshold level, aggregate and service data transfers for other transfer channels of the number of transfer channels.

7. The apparatus of claim 1, wherein the audio transfer circuit includes a timestamp generation circuit configured to generate the first and second timestamps.

8. A method, comprising:

receiving, by an audio transfer circuit in a computer system, a transfer descriptor for a transfer of audio data between a memory and a selected one of a plurality of audio peripherals over a given transfer channel of a plurality of transfer channels;

completing, by the audio transfer circuit, the transfer of the audio data by:

performing a first direct memory access (DMA) operation to transfer the audio data from the memory to a buffer associated with the audio transfer circuit; and performing a second DMA operation to transfer the audio data from the buffer to the selected audio peripheral;

storing, by the audio transfer circuit, a completion status for the transfer, wherein the completion status includes:

a first timestamp indicative of a completion of the DMA operation between the memory and the buffer; and a second timestamp indicative of a completion of the DMA operation between the buffer and the selected audio peripheral; and using, by a software program executing on a processor circuit in the computer system, the first and second timestamps to prioritize ones of the plurality of transfer channels.

9. The method of claim 8, wherein the transfer descriptor is created by the software program operating on the audio data, and wherein upon the transfer descriptor being stored in a FIFO buffer associated with the given transfer channel, the audio transfer circuit is configured to complete the transfer without further involvement from the software program, and wherein upon completing the transfer, the audio transfer circuit is configured to cause an indication to be sent to the software program that the completion status for the transfer is accessible.

10. The method of claim 8, wherein the transfer descriptor specifies a starting location in the memory and a size of the audio data to be transferred.

11. The method of claim 8, further comprising receiving configuration information that specifies a number of the plurality of transfer channels to be supported by the audio transfer circuit.

12. The method of claim 8, further comprising:

receiving configuration information specifying a trigger level for a buffer associated with a particular transfer channel; and upon reaching the specified trigger level for the particular transfer channel, servicing requests for all remaining transfer channels, including both transmit and receive channels.

13. The method of claim 8, further comprising:

receiving, by the audio transfer circuit, configuration information for the plurality of transfer channels;

receiving, by the audio transfer circuit, transfer descriptors that include metadata for performing data transfers over various ones of transfer channels; and arbitrating, by the audio transfer circuit, between various ones of the transfer channels in order to determine which data transfers are to be performed, wherein the arbitrating is based on the received configuration information for the transfer channels.

14. The method of claim 13, wherein the arbitrating uses priority levels that are based, for a given transfer channel, on an amount of data that is buffered and a data rate for the given transfer channel, and wherein thresholds for an amount of data that is to be buffered for a given transfer channel are programmable.

15. A system, comprising:

a memory;

a buffer;

a plurality of peripherals, including at least one audio peripheral;

a processor circuit configured to:

execute software that is configured to operate on audio data; and initiate a transfer of audio data from the memory to a selected one of the peripherals; and a direct memory access (DMA) control circuit configured to:

transfer, via the buffer, the audio data from the memory to the selected peripheral, wherein to perform the transfer, the DMA control circuit is configured to:

store a first timestamp indicative of a first point in time when a first intermediate transfer of the audio data from the memory to the buffer completes; and store a second timestamp indicative of a second point in time when a second intermediate transfer of the audio data from the buffer to the selected peripheral completes;

wherein the processor circuit is further configured to prioritize, based on the first and second timestamps, subsequent transfers into and out of the buffer.

16. The system of claim 15, wherein the first and second timestamps are reported to the software via an interrupt upon completion of the transfer between the memory and the selected peripheral.

17. The system of claim 15, wherein the DMA control circuit includes a plurality of transfer channels and is further configured to arbitrate among the plurality of transfer channels.

18. The system of claim 17, wherein the DMA control circuit is further configured to arbitrate among the plurality of transfer channels separately for transmit and receive transfer channels such that transfer channels having data buffer levels below respective threshold levels are prioritized and serviced until all the prioritized transfer channels reach their respective threshold level.

19. The system of claim 18, wherein the DMA control circuit is configured to arbitrate among the plurality of transfer channels by servicing all the transfer channels in round-robin fashion after the prioritized transfer channels reach their thresholds.

20. The system of claim 19, wherein at least one of the transfer channels has a configurable transfer threshold.

* * * * *